(12) United States Patent
Betts et al.

(10) Patent No.: US 11,502,639 B2
(45) Date of Patent: Nov. 15, 2022

(54) TUBULAR FLUIDIC ACTUATOR SYSTEM AND METHOD

(71) Applicant: Sunfolding, Inc., San Francisco, CA (US)

(72) Inventors: Kyle Douglass Betts, San Francisco, CA (US); Saul Thomas Griffith, San Francisco, CA (US); Jeffrey Charles Lamb, San Francisco, CA (US); Peter Sturt Lynn, Alameda, CA (US); Leila Marcia Madrone, Sebastopol, CA (US); Matthew Ness Schneider, Sierra Madre, CA (US); Kevin Patrick Simon, Somerville, MA (US); Louis Basel, Berkeley, CA (US); Victoria Hammett Macomber, San Francisco, CA (US); Dan Goldwater, Amherst, MA (US)

(73) Assignee: SUNFOLDING, INC., San Francisco, CA (US)

( * ) Notice: Subject to any disclaimer, the term of this patent is extended or adjusted under 35 U.S.C. 154(b) by 545 days.

(21) Appl. No.: 16/423,899

(22) Filed: May 28, 2019

(65) Prior Publication Data

US 2019/0372512 A1 Dec. 5, 2019

Related U.S. Application Data

(60) Provisional application No. 62/845,118, filed on May 8, 2019, provisional application No. 62/677,560, filed on May 29, 2018.

(51) Int. Cl.
*H02S 20/32* (2014.01)
*F24S 30/425* (2018.01)
(Continued)

(52) U.S. Cl.
CPC .............. *H02S 20/32* (2014.12); *F15B 15/10* (2013.01); *F24S 25/12* (2018.05); *F24S 30/425* (2018.05);
(Continued)

(58) Field of Classification Search
None
See application file for complete search history.

(56) References Cited

U.S. PATENT DOCUMENTS

| 979,460 A | 12/1910 | Fulton |
| 2,920,656 A | 1/1960 | Bertolet |

(Continued)

FOREIGN PATENT DOCUMENTS

| CA | 2330612 A1 | 6/2002 |
| CL | 201501867 | 6/2015 |

(Continued)

OTHER PUBLICATIONS

"Final Rejection dated Sep. 9, 2016," U.S. Appl. No. 14/064,072, filed Oct. 25, 2013, 15 pages.

(Continued)

*Primary Examiner* — Steven M Marsh
(74) *Attorney, Agent, or Firm* — Davis Wright Tremaine LLP

(57) ABSTRACT

An actuator comprising a bottom plate, a top-plate and one or more hub assembly extending between and rotatably coupling the bottom and top plates. The actuator also includes one or more bellows units disposed between the top plate and bottom plate, the one or more bellows units comprising a first and second inflatable bellows coupled by a web extending between the first and second bellows, the first and second bellows defining respective and separate first and second bellows cavities, with the first bellows of the bellows units disposed on a first side of the bottom plate, and (Continued)

the second bellows of the bellows units disposed on a second side of the bottom plate, opposing the first side, and between the top and bottom plates.

20 Claims, 22 Drawing Sheets

(51) Int. Cl.
    *F24S 25/12*     (2018.01)
    *F15B 15/10*     (2006.01)
    *F24S 30/00*     (2018.01)

(52) U.S. Cl.
    CPC ........ *F24S 2030/11* (2018.05); *F24S 2030/19* (2018.05)

(56) References Cited

U.S. PATENT DOCUMENTS

| | | | |
|---|---|---|---|
| 3,284,964 | A | 11/1966 | Norio |
| 3,472,062 | A | 10/1969 | Owen |
| 3,602,047 | A | 8/1971 | Kistler |
| 3,800,398 | A | 4/1974 | Harrington, Jr. |
| 3,956,543 | A | 5/1976 | Stangeland |
| 3,982,526 | A | 9/1976 | Barak |
| 4,063,543 | A | 12/1977 | Hedger |
| 4,102,326 | A | 7/1978 | Sommer |
| 4,120,635 | A | 10/1978 | Langecker |
| 4,154,221 | A | 5/1979 | Nelson |
| 4,172,443 | A | 10/1979 | Sommer |
| 4,175,540 | A | 11/1979 | Roantree et al. |
| 4,185,615 | A | 1/1980 | Bottum |
| 4,198,954 | A | 4/1980 | Meijer |
| 4,345,582 | A | 8/1982 | Aharon |
| 4,424,802 | A | 1/1984 | Winders |
| 4,459,972 | A | 7/1984 | Moore |
| 4,464,980 | A | 8/1984 | Yoshida |
| 4,494,417 | A | 1/1985 | Larson et al. |
| 4,566,432 | A | 1/1986 | Sobczak et al. |
| 4,620,771 | A | 11/1986 | Dominguez |
| 4,751,868 | A | 6/1988 | Paynter |
| 4,768,871 | A | 9/1988 | Mittelhauser et al. |
| 4,777,868 | A | 10/1988 | Larsson |
| 4,784,042 | A | 11/1988 | Paynter |
| 4,832,001 | A | 5/1989 | Baer |
| 4,848,179 | A | 7/1989 | Ubhayakar |
| 4,900,218 | A | 2/1990 | Sutherland |
| 4,939,982 | A | 7/1990 | Immega et al. |
| 4,954,952 | A | 9/1990 | Ubhayakar et al. |
| 4,977,790 | A | 12/1990 | Nishi et al. |
| 5,021,798 | A | 6/1991 | Ubhayakar |
| 5,040,452 | A | 8/1991 | Van Kerkvoort |
| 5,080,000 | A | 1/1992 | Bubic et al. |
| 5,156,081 | A | 10/1992 | Suzumori |
| 5,181,452 | A | 1/1993 | Immega |
| 5,251,538 | A | 10/1993 | Smith |
| 5,317,952 | A | 6/1994 | Immega |
| 5,337,732 | A | 8/1994 | Grundfest et al. |
| 5,386,741 | A | 2/1995 | Rennex |
| 5,469,756 | A | 11/1995 | Feiten |
| 5,697,285 | A | 12/1997 | Nappi et al. |
| 5,816,769 | A | 10/1998 | Bauer et al. |
| 6,046,399 | A * | 4/2000 | Kapner .................. F24S 25/16 52/173.3 |
| 6,054,529 | A | 4/2000 | O'Donnell et al. |
| 6,080,927 | A | 6/2000 | Johnson |
| 6,178,872 | B1 | 1/2001 | Schulz |
| 6,557,804 | B1 | 5/2003 | Carroll |
| 6,772,673 | B2 | 8/2004 | Seto et al. |
| 6,875,170 | B2 | 4/2005 | Francois et al. |
| 7,331,273 | B2 | 2/2008 | Kerekes et al. |
| 7,531,741 | B1 | 5/2009 | Melton et al. |
| 7,614,615 | B2 | 11/2009 | Egolf |
| 8,201,473 | B2 | 6/2012 | Knoll |
| 8,305,736 | B2 | 11/2012 | Yee et al. |
| 8,657,271 | B2 | 2/2014 | Szekely et al. |
| 8,700,215 | B2 | 4/2014 | Komatsu et al. |
| 8,863,608 | B2 | 10/2014 | Fischer et al. |
| 8,899,359 | B1 | 12/2014 | Hafenrichter et al. |
| 9,133,864 | B2 | 9/2015 | Menon et al. |
| 9,624,911 | B1 * | 4/2017 | Griffith .................. B25J 18/06 |
| 9,641,123 | B2 * | 5/2017 | Swahn .................. F24S 25/11 |
| 9,806,669 | B2 * | 10/2017 | Michotte De Welle ...................... H02S 20/32 |
| 9,919,434 | B1 | 3/2018 | Rey et al. |
| 10,135,388 | B2 | 11/2018 | Madrone et al. |
| 10,284,354 | B2 | 5/2019 | Sebire et al. |
| 10,384,354 | B2 | 8/2019 | Griffith et al. |
| 10,562,180 | B2 | 2/2020 | Telleria et al. |
| 10,601,366 | B2 | 3/2020 | Madrone et al. |
| 10,605,365 | B1 * | 3/2020 | Griffith .................. H02S 20/32 |
| 11,059,190 | B2 | 7/2021 | Griffith et al. |
| 2005/0034752 | A1 | 2/2005 | Gross et al. |
| 2006/0049195 | A1 | 3/2006 | Koussios et al. |
| 2009/0097994 | A1 | 4/2009 | Beck et al. |
| 2009/0115292 | A1 | 5/2009 | Ueda et al. |
| 2009/0151775 | A1 | 6/2009 | Pietrzak |
| 2009/0314119 | A1 | 12/2009 | Knoll |
| 2010/0043776 | A1 | 2/2010 | Gee |
| 2010/0125401 | A1 | 5/2010 | Hamama et al. |
| 2010/0180883 | A1 | 7/2010 | Oosting |
| 2011/0073161 | A1 | 3/2011 | Scanlon |
| 2011/0114080 | A1 | 5/2011 | Childers et al. |
| 2011/0277815 | A1 | 11/2011 | Sankrithi |
| 2012/0210818 | A1 | 8/2012 | Fischer et al. |
| 2012/0285509 | A1 | 11/2012 | Surganov |
| 2013/0247962 | A1 | 9/2013 | Sakai et al. |
| 2013/0306135 | A1 | 11/2013 | Planting |
| 2015/0244309 | A1 | 8/2015 | Sakai et al. |
| 2016/0052347 | A1 | 2/2016 | Nagai et al. |
| 2016/0123592 | A1 | 5/2016 | Drake et al. |
| 2017/0163208 | A1 | 6/2017 | Almy et al. |
| 2017/0184327 | A1 * | 6/2017 | Griffith .................. H02S 40/00 |
| 2017/0282360 | A1 | 10/2017 | Telleria et al. |
| 2018/0302025 | A1 * | 10/2018 | Basel .................. H02S 20/10 |
| 2018/0302027 | A1 * | 10/2018 | Betts .................. B25J 9/142 |
| 2019/0372512 | A1 | 12/2019 | Betts et al. |
| 2020/0304057 | A1 | 9/2020 | Suan et al. |

FOREIGN PATENT DOCUMENTS

| | | |
|---|---|---|
| CL | 201701939 | 7/2017 |
| CN | 101783619 A | 7/2010 |
| CN | 103222067 A | 7/2013 |
| CN | 103786165 A | 5/2014 |
| CN | 205986743 U | 2/2017 |
| CN | 208063113 U | 11/2018 |
| CO | 09035821 | 4/2009 |
| CO | 6180473 A2 | 7/2010 |
| CO | 6450667 A2 | 5/2012 |
| DE | 202011050327 U1 | 9/2012 |
| EP | 2648226 A1 | 10/2013 |
| FR | 2603228 A1 | 3/1988 |
| JP | 2014116360 A | 6/2014 |
| KR | 101034478 B1 | 5/2011 |
| KR | 20130019502 A | 2/2013 |
| RU | 2012137650 A | 3/2014 |
| RU | 2516595 C2 | 5/2014 |
| RU | 2560652 C2 | 8/2015 |
| RU | 2611571 C1 | 2/2017 |
| SU | 358814 A3 | 11/1972 |
| SU | 1346918 A1 | 10/1987 |
| TW | 201116726 A | 5/2011 |
| WO | 0117731 A1 | 3/2001 |
| WO | 2009108159 A1 | 9/2009 |
| WO | 2011094084 A2 | 8/2011 |
| WO | 2012015378 A1 | 2/2012 |

(56) References Cited

FOREIGN PATENT DOCUMENTS

| WO | 2016123592 A1 | 8/2016 |
|---|---|---|
| WO | 2018195116 A1 | 10/2018 |

OTHER PUBLICATIONS

"Non-Final Rejection dated Aug. 18, 2016," U.S. Appl. No. 14/064,071, filed Oct. 25, 2013, 13 pages.

Author Unkown, http://www.utilityscalesolar.com/Utility_Scale_Solar,_Inc./USS_Homepage.html, Utility Scale Solar, Inc., 2011.

Brazilian Preliminary Office Action dated Jun. 30, 2020, Patent Application No. 1120170164612, filed Jan. 30, 2016, 4 pages.

International Search Report and Written Opinion dated Aug. 14, 2017, International Patent Application No. PCT/US2017/024730, filed Mar. 29, 2017.

International Search Report and Written Opinion dated Aug. 2, 2018, International Patent Application No. PCT/US2018/028020, filed Apr. 17, 2018, 7 pages.

International Search Report and Written Opinion dated Aug. 2, 2018, International Patent Application No. PCT/US2018/028024, filed Apr. 17, 2018, 7 pages.

International Search Report and Written Opinion dated Aug. 29, 2019, Patent Application No. PCT/US2019/034202, filed May 28, 2019, 7 pages.

International Search Report and Written Opinion dated Aug. 9, 2018, International Patent Application No. PCT/US2018/028025, filed Apr. 17, 2018, 7 pages.

International Search Report and Written Opinion dated May 5, 2016, International Patent Application No. PCT/US2016/015857, filed Jan. 30, 2016.

International Search Report and Written Opinion dated Sep. 2, 2021, Patent Application No. PCT/US2021/038534, 7 pages.

Seba, "Solar Trillions," pp. 246-250, Jan. 28, 2010.

The Wiley Encyclopedia of Packaging Technology 3rd Ed., Wiley Publications, p. 145, Sep. 2009.

Brazilian Technical Examination Report dated Aug. 2, 2022, Patent Application No. 1120170164612, filed Jan. 30, 2016, 4 pages.

Australian First Examination Report dated Jul. 12, 2022, Patent Application No. 2018255296, filed Apr. 17, 2017, 5 pages.

Australian Second Examination Report dated Jun. 30, 2022, Patent Application No. 2020239824, filed Oct. 15, 2019, 3 pages.

Australia IPO Notice of Acceptance dated Aug. 22, 2022, Patent Application No. 2020239824, 3 pages.

Australian First Examination Report dated Jul. 28, 2022, Patent Application No. 2019277145, 3 pages.

Brazilian Preliminary Office Action dated Jul. 15, 2022, Patent Application No. 1120170164612, filed Jan. 30, 2016, 4 pages.

Chilean Notice of Allowance dated Aug. 11, 2022, Patent Application No. 2019-002938, filed Oct. 16, 2019, 2 pages.

China IPO Preliminary Office Action dated Aug. 30, 2022, Patent Application No. 2018800252687, filed Apr. 17, 2018, 3 pages.

IndiaIPO Examination Report dated Sep. 7, 2022, Patent Application No. 202017044335, 6 pages.

* cited by examiner

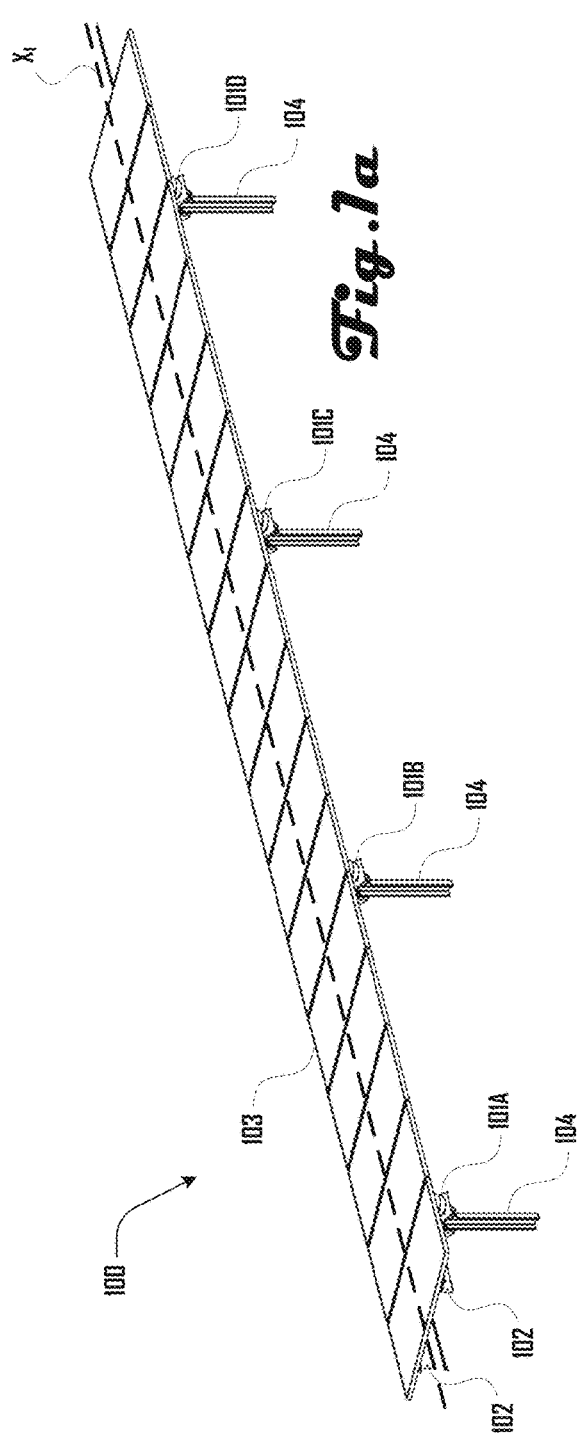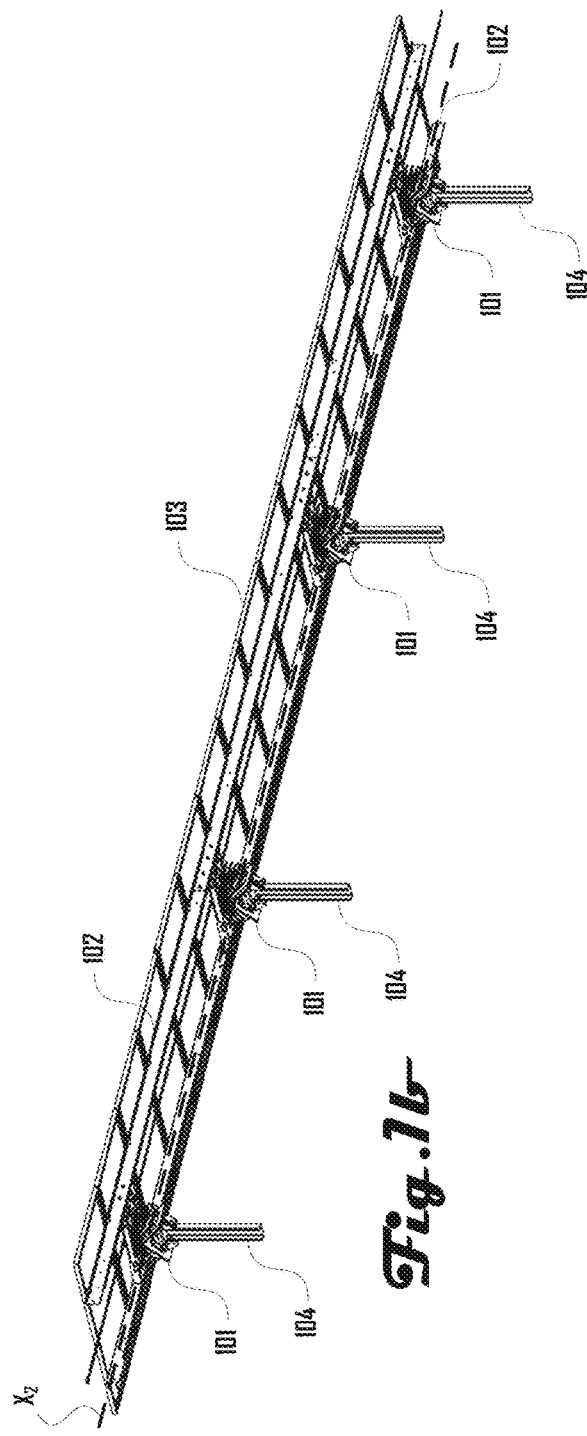

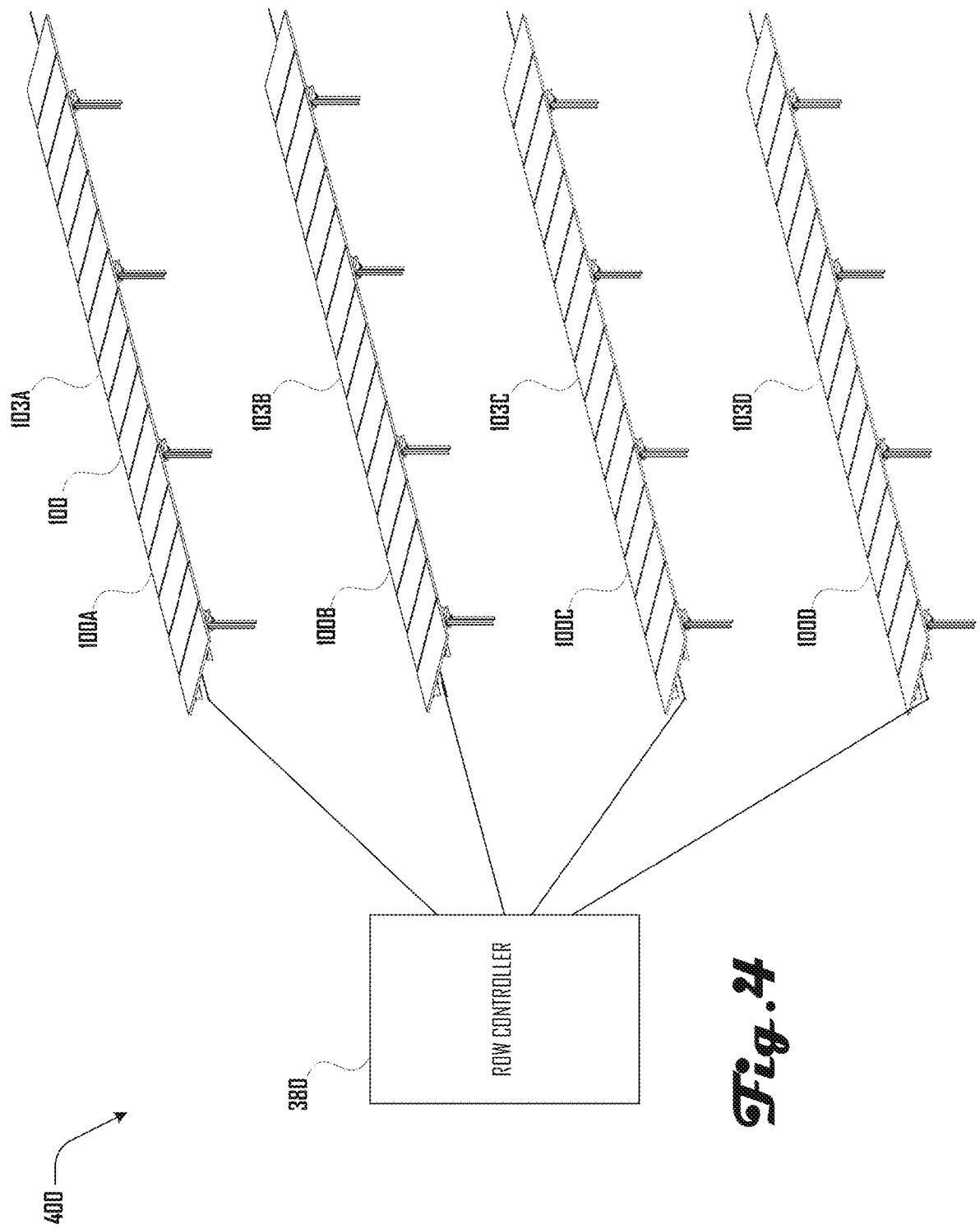

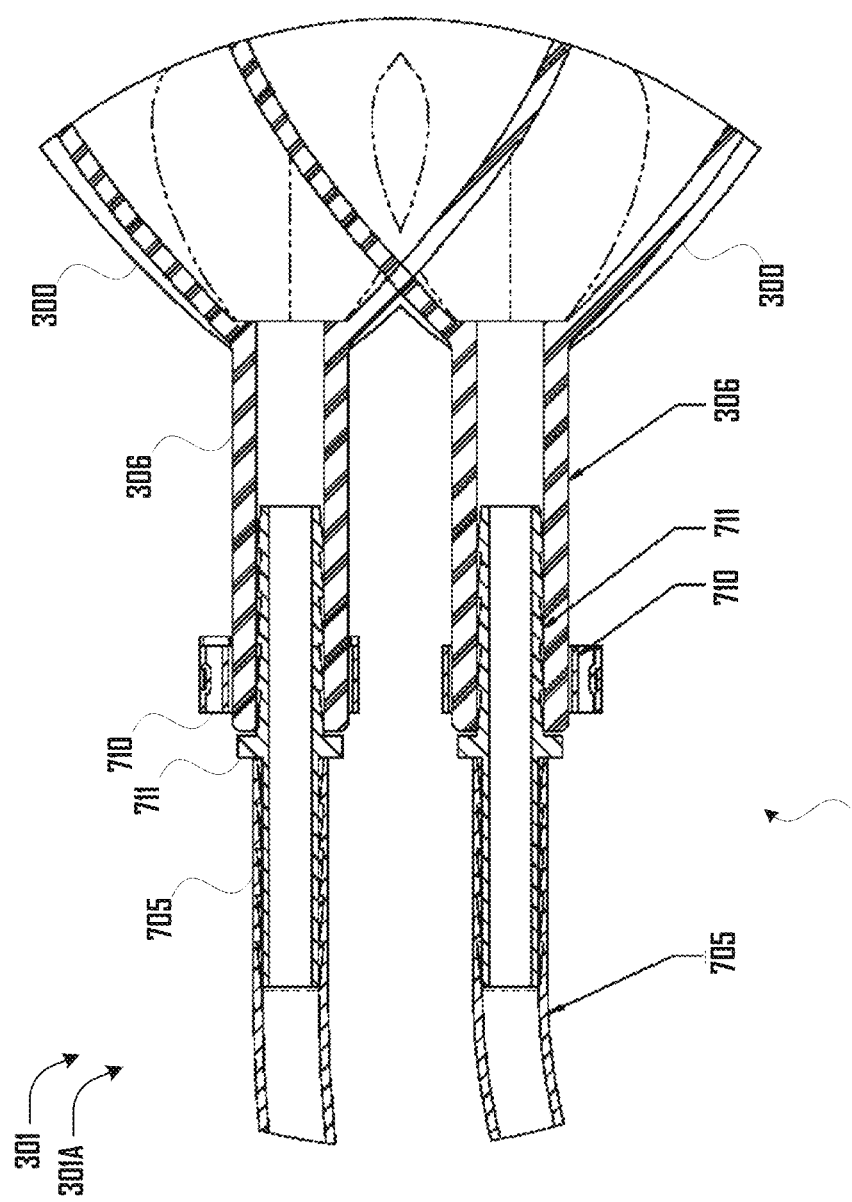

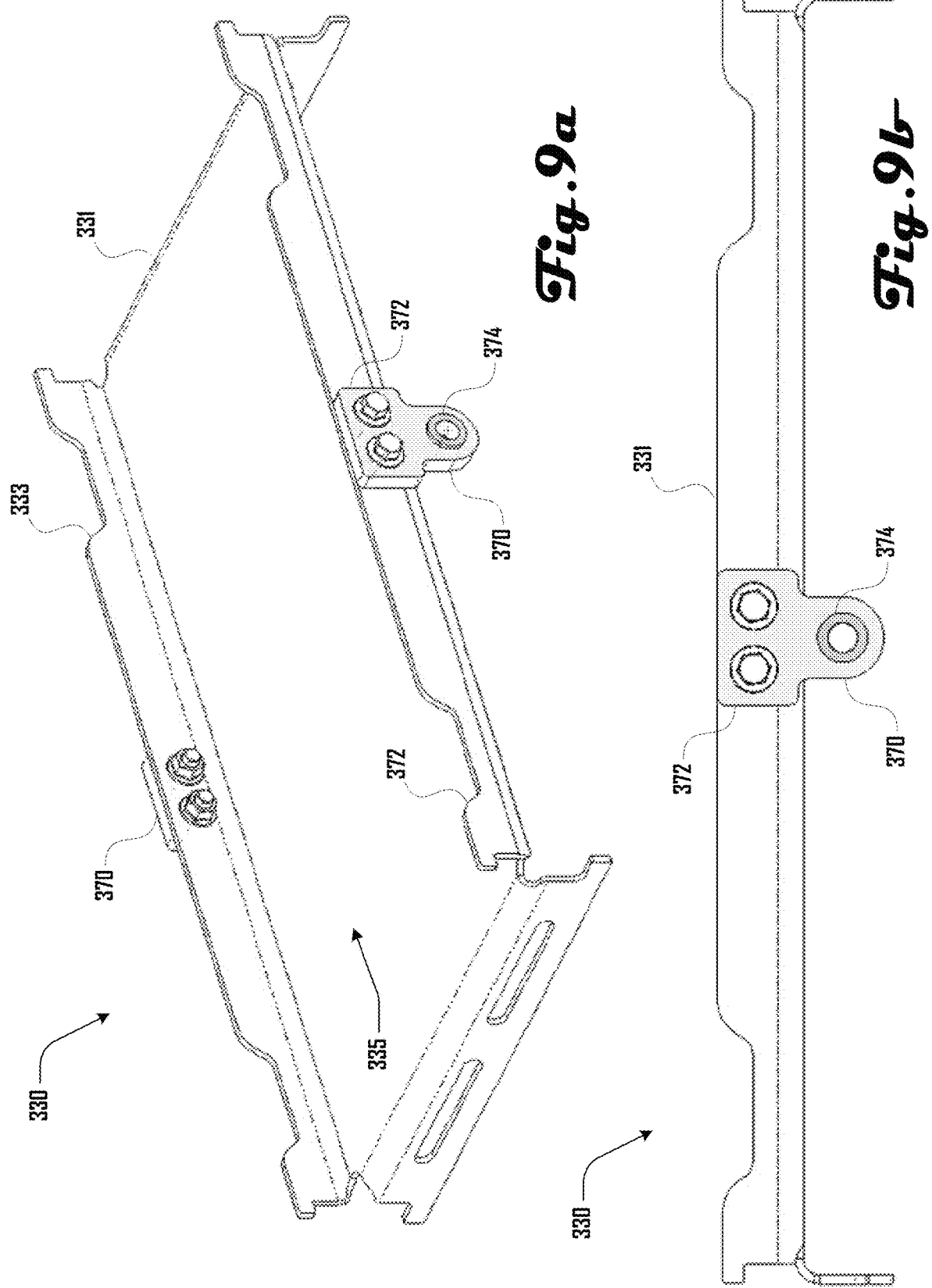

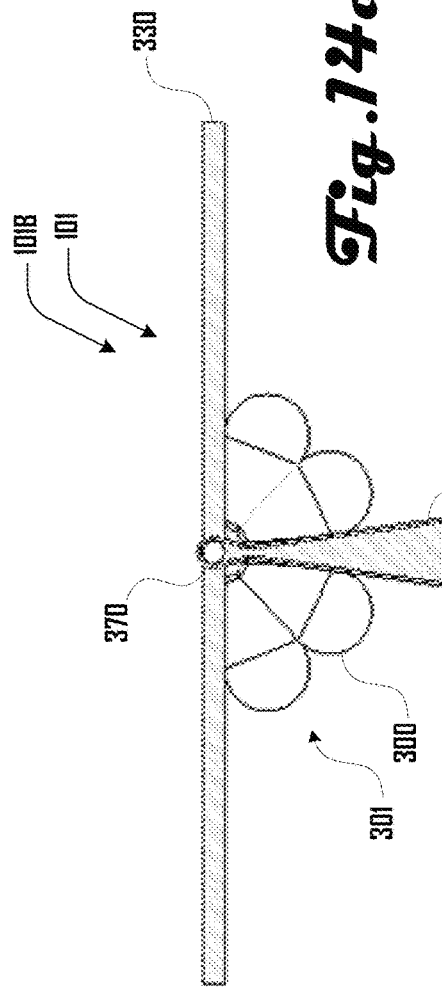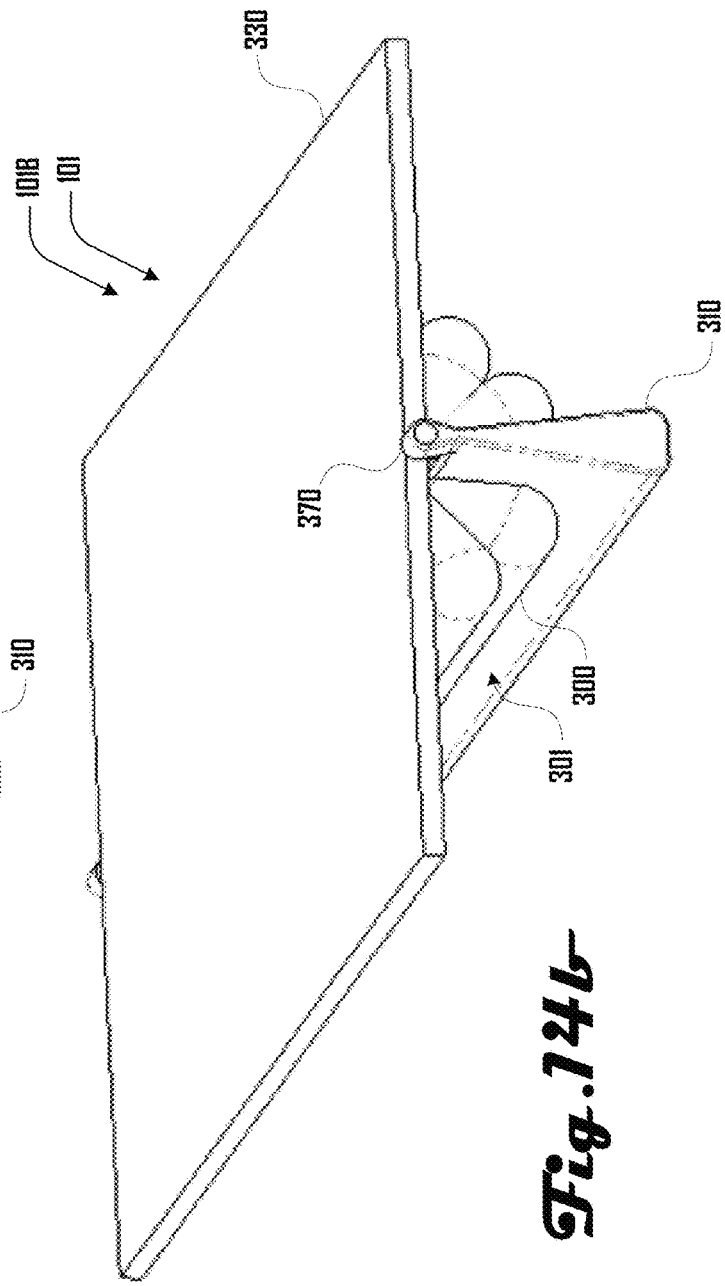

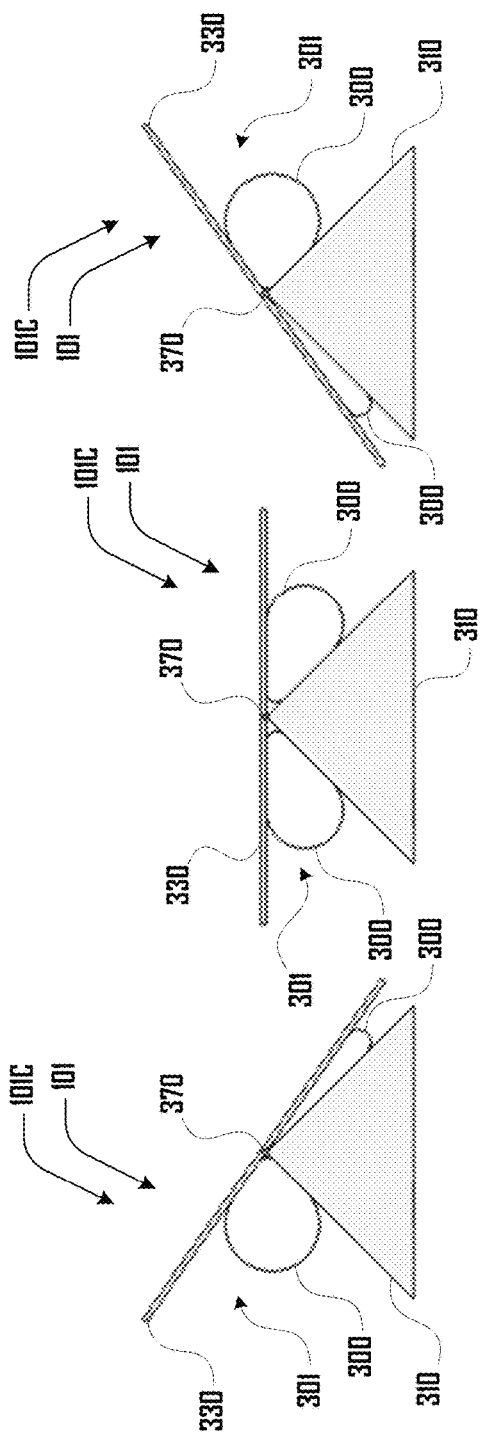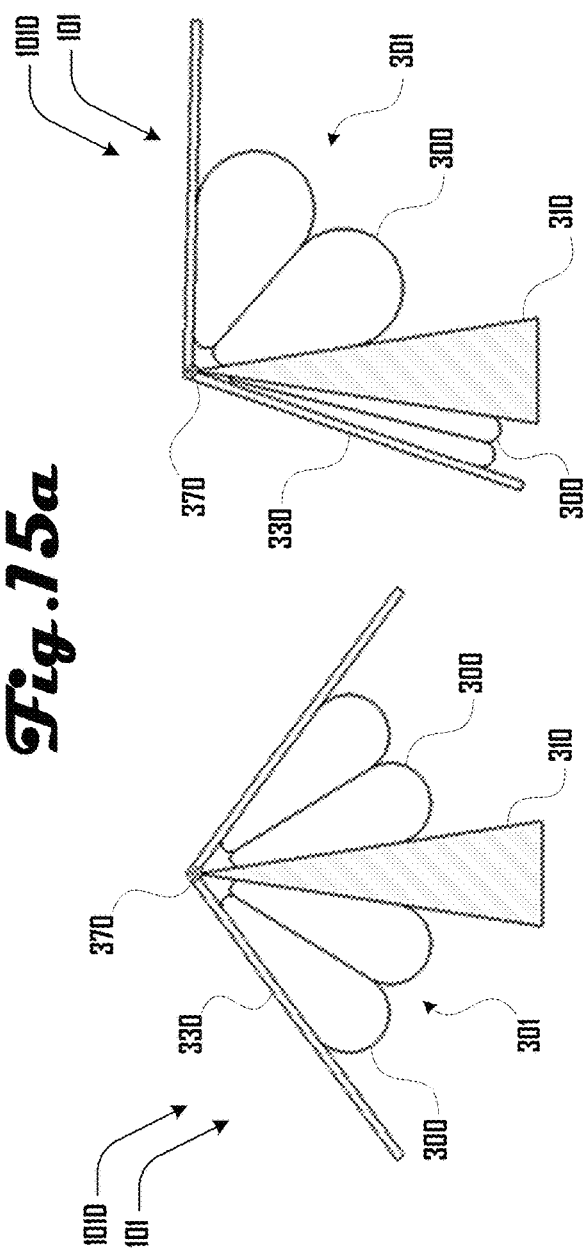
Fig.15a
Fig.15b

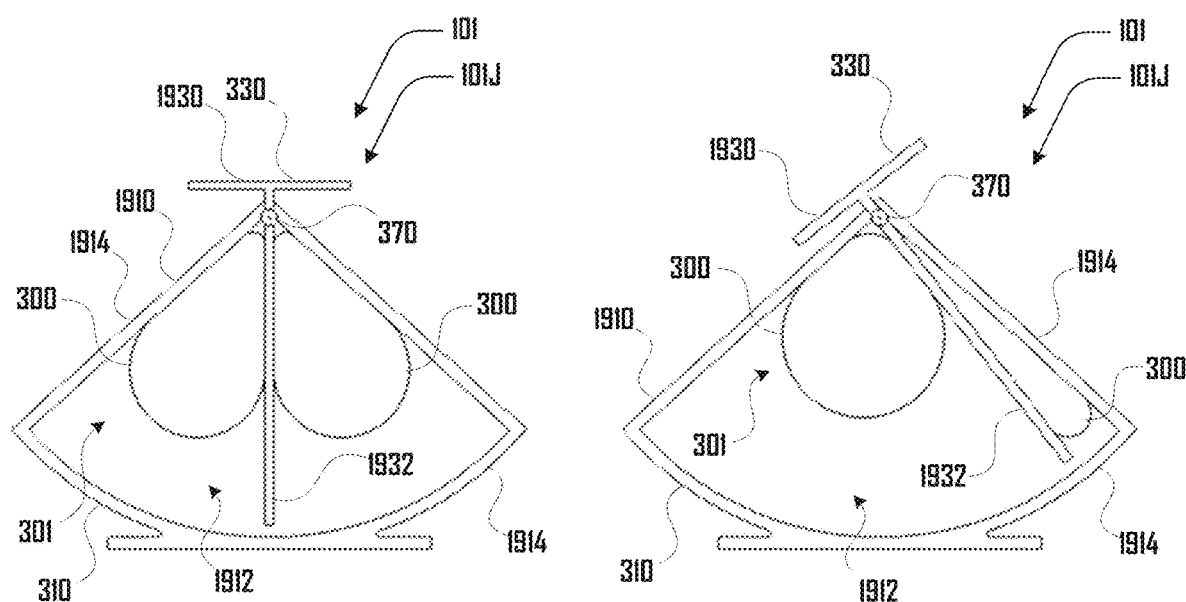
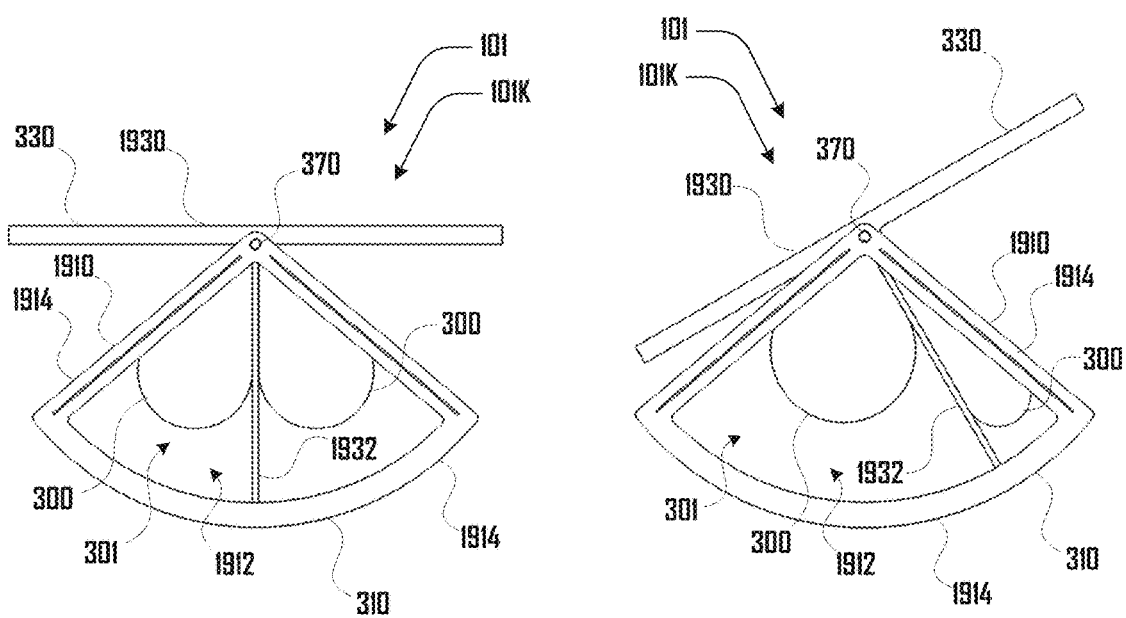

TUBULAR FLUIDIC ACTUATOR SYSTEM AND METHOD

CROSS REFERENCE TO THE RELATED APPLICATIONS

This application is a non-provisional of and claims priority to U.S. Patent Application No. 62/845,118, filed May 8, 2019 entitled "TUBULAR FLUIDIC ACTUATOR AND METHOD SYSTEM AND METHOD" and is a non-provisional of and claims priority to U.S. provisional patent application 62/677,560, filed May 29, 2018 entitled "TUBULAR FLUIDIC ACTUATOR AND METHOD SYSTEM AND METHOD." These applications are hereby incorporated herein by reference in their entirety and for all purposes.

This application is related to U.S. provisional patent application Ser. No. 15/012,715 filed Feb. 1, 2016 entitled "FLUIDIC ACTUATOR SYSTEM AND METHOD," which claims priority to U.S. provisional patent application 62/110,275 filed Jan. 30, 2015. This application is also related to U.S. application Ser. Nos. 14/064,070 and 14/064,072, both filed Oct. 25, 2013, which claim the benefit of U.S. Provisional Application Nos. 61/719,313 and 61/719,314, both filed Oct. 26, 2012. All of these applications are hereby incorporated herein by reference in their entirety and for all purposes.

BACKGROUND

Conventional solar panel arrays are static and unmoving or configured to track the sun throughout the day to provide optimal capture of solar energy. Static solar panel arrays are often undesirable because they are unable to move and accommodate the changing angle of the sun during the day and throughout the year.

On the other hand, conventional moving solar panel arrays are also often undesirable because of their high cost of installation, the complexity of the mechanisms that move the solar panels, and the relatively high energy cost associated with actuating the solar panels. For example, some systems include motors that move individual solar panels or groups of solar panels. Such motors and other complex moving parts are expensive to install and maintain.

In view of the foregoing, a need exists for an improved solar panel actuation system and method in an effort to overcome the aforementioned obstacles and deficiencies of conventional solar panel actuation systems.

BRIEF DESCRIPTION OF THE DRAWINGS

FIGS. 1a and 1b illustrate a respective top perspective and bottom perspective view of a solar tracker in accordance with various embodiments.

FIG. 4 illustrates an example of a solar tracking system that includes a row controller that controls a plurality of rows of solar trackers.

FIG. 8 illustrates a close-up cross-sectional view of a coupling between fluidic lines and a bellows assembly in accordance with an embodiment.

FIGS. 9a and 9b illustrate a perspective view and a side view of a top plate in accordance with an embodiment.

FIGS. 13, 14a and 14b illustrate an embodiment of an actuator assembly in accordance with another embodiment.

FIG. 15a illustrates an embodiment of an actuator assembly in accordance with a further embodiment.

FIG. 15b illustrates an embodiment of an actuator assembly in accordance with a still further embodiment.

FIG. 19a illustrates an embodiment of an actuator assembly in accordance with a further embodiment.

FIG. 19b illustrates an embodiment of an actuator assembly in accordance with a still further embodiment.

Figure 2:
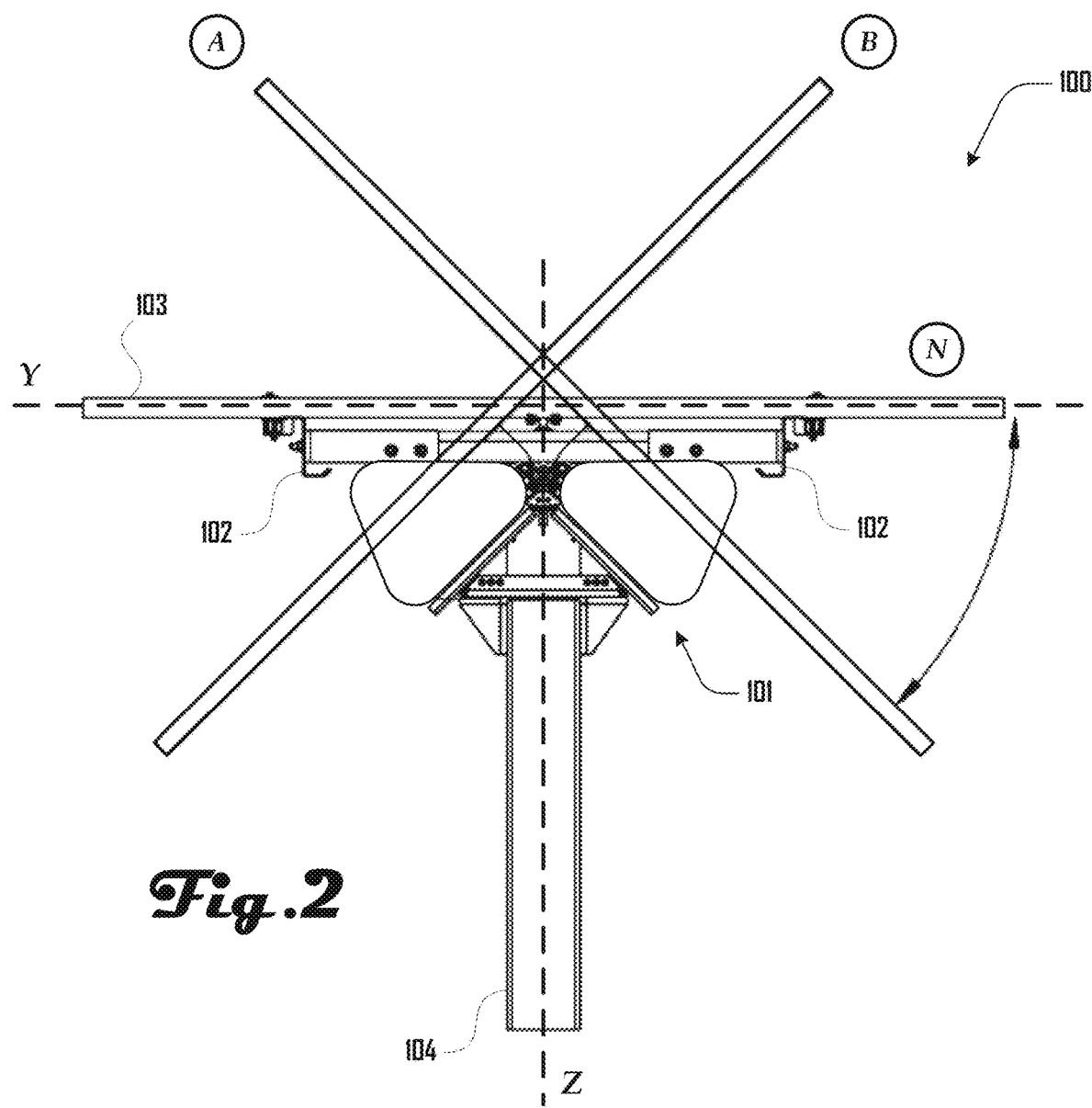
FIG. 2 illustrates a side view of a solar tracker during movement.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available solar panel actuation systems are deficient, a fluidic actuation system as described herein can prove desirable and provide a basis for a wide range of applications, such as efficiently and cost-effectively moving solar panels about one or more axes. This result can be achieved, according to various embodiments disclosed herein, by a compliant pressurized fluid-filled actuator, hereafter referred to as a bladder, bellows, or the like, that can be part of an actuator assembly.

FIGS. 1a and 1b illustrate respective top perspective and bottom perspective views of a solar tracker 100 in accordance with various embodiments. FIG. 2 illustrates a side view of the solar tracker 100. As shown in FIGS. 1a, 1b and 2, the solar tracker 100 can comprise a plurality of photovoltaic cells 103 disposed along a length having axis $X_1$ and a plurality of pneumatic actuators 101 configured to collectively move the array of photovoltaic cells 103. As shown in FIG. 1b, the photovoltaic cells 103 are coupled to rails 102 that extend along parallel axes $X_2$, which are parallel to axis $X_1$. Each of the plurality of actuators 101 extend between and are coupled to the rails 102, with the actuators 101 being coupled to respective posts 104. As shown in FIG. 2, the posts 104 can extend along an axis Z, which can be perpendicular to axes $X_1$ and $X_2$ in various embodiments.

As shown in FIG. 2, and discussed in more detail herein, the actuators 101 can be configured to collectively tilt the array of photovoltaic cells 103 based on an angle or position of the sun, which can be desirable for maximizing light exposure to the photovoltaic cells 103 and thereby maximizing electrical output of the photovoltaic cells 103. In various embodiments, the actuators 101 can be configured to move the photovoltaic cells 103 between a plurality of configurations as shown in FIG. 2, including a neutral configuration N where the photovoltaic cells 103 are disposed along axis Y that is perpendicular to axis Z. From the neutral configuration N, the actuators 101 can be configured to move the photovoltaic cells 103 to a first maximum tilt position A, to a second maximum tilt position B, or any position therebetween. In various embodiments, the angle between the neutral configuration N and the maximum tilt positions A, B can be any suitable angle, and in some embodiments, can be the same angle. Such movement can be used to position the photovoltaic cells 103 toward the sun, relative to an angle of the sun, to reflect light toward a desired position, or the like.

In one preferred embodiment as shown in FIGS. 1a and 1b, a solar tracker 100 can comprise a plurality of photovoltaic cells 103 that are collectively actuated by four actuators 101 disposed along a common axis. However, in further embodiments, a solar tracker 100 can comprise any suitable number of actuators 101, including one, two, three, four, five, six, seven, eight, nine, ten, fifteen, twenty, fifty, one hundred, or the like. Similarly, any suitable number of photovoltaic cells 103 can be associated with a solar tracker 100 in further embodiments. Additionally, while photovoltaic cells 103 are shown in example embodiments herein, in further embodiments, actuators 101 can be used to move various other objects or structures, including mirrors, reflectors, imaging devices, communications devices, and the like.

In various applications, the ability to lock out actuator rotation can be desirable. In some embodiments, the lock out can be generated at predetermined angles. Locking out in a flat or 0 degree, 45 degree or max range of motion lock can be desired in various applications. Other applications can include instantaneous lock out, or the ability to freeze motion and increase stiffness at any angle.

In applications that may require specific angle lock outs, a variety of mechanism can be employed. For extreme angle lock outs, hard stops can be employed. A hard stop can be a solid state feature that prevents rotation past a set angle. In some examples, a bellows 300 (See FIG. 3) can be over pressurized to press up against a hard stop, increasing its stiffness at the extreme angle.

Hard stop features can take a variety of forms. For example, in some embodiments, the actuator assembly 101 can comprise one or more tensile rope or webbing coupled to and extending between top and bottom plates 310, 330 of the actuator assembly 101 (see FIG. 3). In another example, positive bosses can be provided as part of the actuator assembly 101 or proximate to the actuator assembly such that contact with the bosses constrains the range of motion of the actuator assembly. In various embodiments, such hard stops can be beneficial for preventing damage to the actuator assembly in high winds or exposure to other forces that might over-extend the actuator assembly. Pressurizing against a hard stop can also prevent excitation of destructive resonant frequencies induced by oscillatory loads (such as wind). In some embodiments, it can be beneficial to stow the actuator assembly against a hard stop when exposure to undesirable forces is anticipated (e.g., during a storm, or the like). These hard stops can also have a locking feature in order to stop all movement of the tracker when hit. This can serve as a stow mechanism that can further prevent damage to the tracker in a high-wind event.

In some embodiments, positional lock out at 0 degrees, or plumb to gravity, can be desirable. Mechanisms that can achieve this behavior include but are not limited to: 4 bar linkages, pneumatic rams, solenoids, lockable dampers, spring returns, inflated bladders, pressure sensitive toggles, and the like.

Stow, lock outs or hard stops can be provided in various suitable ways in accordance with further embodiments. For example, in one embodiment, there can be a separate actuator lock out for purposes of stow. For example, a separate small bladder can be used to actuate a locking mechanism that rigidly, or near rigidly, fixes an actuator assembly. In one embodiment, such a mechanism can comprise a pin that engages a corresponding hole or slot, or such a mechanism can comprise multiple pins or toothed arrangements that engage corresponding features enabling multiple locking positions. In another embodiment, such a mechanism can comprise corresponding brake pads that enable continuous locking independent of tracker position. Off-normal loading can also be used to engage a locking mechanism in accordance with some embodiments.

In further embodiments, a bar-linkage lock out can be used to stow or lock an actuator assembly 101. For example, in one embodiment, an actuator piloted four bar linkage can be used to lock out tracker motion. In such an embodiment, An over-center four bar linkage between top and bottom plates 310, 330 can be used to fix the position of the actuator assembly 101 for the purpose of stow, and the like. Such a mechanism can be actuated by an external actuator, collective bladder pressure, off-normal loading, or the like.

Other embodiments can require instantaneous lock out, or lock out in any position. Mechanisms that can be used to achieve this behavior include but are not limited to: air brakes, drum brakes, lock out pins. Lock out mechanisms can be piloted by pneumatics, hydraulics, electronics, passive means, or any other method.

In some embodiments, damping can be desirable for an actuator assembly 101. Damping can be incorporated into the architecture of the actuator assembly 101 directly, or through a peripheral/add-on mechanism. A damper can be configured to smooth movement of a solar panel 103 coupled to the actuator assembly by providing resistance that reduces sudden or jerky movement of the solar panel. In other words, a damper can be configured to counter dynamic loading modes (for example, wind-induced oscillatory modes) and help with smoothing oscillation of an actuator assembly. Additionally, inclusion of dampers can be beneficial because it can allow an actuator assembly 101 to operate at a lower operating pressure, which can result in reduced stress on the actuator assembly, including stress on bellows, bladders, and the like.

To increase energy loss due to friction and enhancing damping, in some examples, material choice of high coefficient of friction materials can be employed. In some embodiments, including in various friction-based pivot dampers, the dampening coefficient can be modulated by varying the collective force applied by the bellows. By increasing collective bellows pressure, the stiffness provided by the dampener can be increased, ideal for high dynamic load cases.

In further embodiments, the damper can be configured in any suitable way. For example, the damper can be coupled to a top and bottom plate 310, 330 (see FIG. 3); the damper can be coupled to the bottom plate 310 and the second support; or the like. Add-on dampers can be linear or rotary in nature.

Add-on dampers can make use of viscous fluid dynamics, centripetal acceleration, friction losses, gas diffusion or any other applicable phenomenon. In further embodiments, a damper can be internally located or integrated directly into a compliant fluidic actuator, bellows or bladders. For example, the material of inflatable bellows can have a high damping coefficient, the inflatable bellows can be partially filled with a compliant material with a high damping coefficient, a block of porous material can be inserted into the inflatable bellows that restricts the passage of fluids in and out of said material thereby achieving damping, a block of elastomeric material that changes volume in response to external pressure with a significant damping coefficient, the bellows can be wrapped in a damping elastomeric material, and so forth.

Add-on mechanisms that increase damping and energy loss include but are not limited to: centrifugal clutches, viscous speed governors, linear viscous dampers, dashpots, viscoelastic crush ribs, or the like. In further embodiments, bladders or bellows can be filled with a fluid such as water, or the like, to generate a suitable damping effect. The damper can take both linear and rotary forms in accordance with various embodiments. In further embodiments a damper can be integrated with a flexure, hub or pivot system or between plates. For example, a flexure can be encased in an elastomeric damping material which might further serve to maintain separation of endplates, or elastomeric damping blocks can be stacked between plates.

The actuator assembly 101 can be fixed to a rack, a driven post, a space frame, directly to the ground, or any other suitable substrate. For example, the actuator assembly 101 can be coupled to the ground or other structure via a post 104 as shown in FIGS. 1a, 1b and 2. The actuator assembly 101 can be mounted to this post using bolts, nuts and washers through the flange of the member, or through a web of a bellows unit. An actuator bottom-plate can have built-in mounting features, or separate mounting brackets can be used.

The actuator assembly 101 can be attached to a substrate through a mounting bracket. A mounting bracket can comprise a plurality of components. A mounting bracket can allow for positional adjustment in one or many vectors or rotational angles. The mounting bracket can be incorporated into, or act in place of an actuator plate. In some embodiments, the actuator assembly 101 can be mounted directly on the substrate, such as a driven beam. In others, the actuator assembly 101 can utilize the mounting substrate, beam or frame to add strength to the actuator assembly 101.

In another embodiment, the actuator assembly 101 can include a base that comprises a plurality of legs. In a further embodiment, the solar-actuator assembly 101 can include a base architecture that holds one or more weights. In one embodiment, the weights can comprise tanks that can be filled with fluid such as water. Such an embodiment can be desirable because the actuator assembly 101 can be light-weight for transport and then secured in place by filling the weights with water or other ballast at a desired location.

The actuator assembly can rotate a payload in various examples, including a payload of photovoltaic cells 103 as shown in FIGS. 1a, 1b and 2. The payload can be attached to the actuator assembly 101 in a variety of ways. In some embodiments, a top plate can be attached to the payload, while a bottom plate remains fixed to a mount. In embodiments with different architecture, the payload can be attached to a center plate, while the frame plate can be fixed to a static mount.

To attach the payload to the actuator assembly 101, the use of spreader brackets or spreader rails can be employed. A spreader bracket rigidly attaches to the rotating plate or component of the actuator assembly 101. The bracket can extend beyond the extreme end of the plate to which it can be attached. The distance of this spread can vary depending on the structural, regulatory or commercially stipulated needs of the payload.

A spreader bracket can be constructed of a metal, such as but not limited to steel, aluminum, a plastic, or a composite such as carbon fiber or fiberglass. A spreader bracket can comprise roll formed sections, extrusions, castings, composite layup or parts manufactured by any suitable method. A payload can be attached to rails that run perpendicular to and can be attached to spreader brackets.

Some embodiments of the actuator assembly 101 can attach a payload to the actuator via a central tube. The tube can couple the payload and the actuator assembly 101 and can transmit torsional load from the actuator to far down the axis of rotation. The torque tube can incorporate spreader brackets to spread attachment points to payload attachment points.

In some embodiments, one or more actuator assemblies 101 can be coupled together. For example, a pair of single-axis actuator assemblies 101 can be coupled together via one or more solar panels 103 and/or supports that extend between the actuator assemblies 101. Similarly, another embodiment comprises a plurality of actuator assemblies 101 coupled together via one or more solar panels 103 and/or supports that extend between the actuator assemblies 101 (e.g., as shown in FIGS. 1a and 1b). In such embodiments, two or more actuator assemblies can move in concert to move a single solar panel array 100. As shown in various embodiments, such an actuator assembly 101 can be anchored in the ground via posts 104, or the like. Supports can be linked together using bolts and nuts with a connecting bracket, or with a nesting feature between the two lengths of support that can eliminate the need for an additional part. For example, an actuator assembly 101 can be coupled to a post 104 via a bolt assembly.

In one application, the actuator assembly can be used to move and position a solar panel 103 that is coupled to a top-plate. For example, in a first example the actuator assembly 101 can include a post 104 that the actuator assembly rests on. The post 104 can be held by a base or disposed in the ground (e.g., via a ground post, ground screw, or the like) in accordance with some embodiments. This post 104 can be driven into the ground at a variable length depending on loading conditions at the site. The post 104 can be a steel component with an I, C, hat, or other cross section. The post 104 can be treated with zinc plating, hot dip galvanizing, or some other method for corrosion resistance.

Although various example embodiments herein describe the use of an actuator assembly 101 with solar panels 103, in further embodiments, an actuator assembly 101 can be used to actuate or otherwise move any other suitable object, including concentrators, reflectors, refractors, and the like.

An actuator assembly 101 having two bladders or bellows can be configured to move a solar panel 103 that is coupled to a top plate of the actuator assembly 101 via respective supports 102 that can be mounted perpendicularly to one another and extend along respective lengths of the solar panel. As discussed herein, the bladders or bellows of a one-axis actuator assembly can be configured to inflate and/or deflate to move the solar panel. Supports 102 can be some lightweight steel channel. This channel can have a C, Z, or some other desirable cross section. This channel can be roll formed, bent, or fabricated in some other manner.

Figure 3:
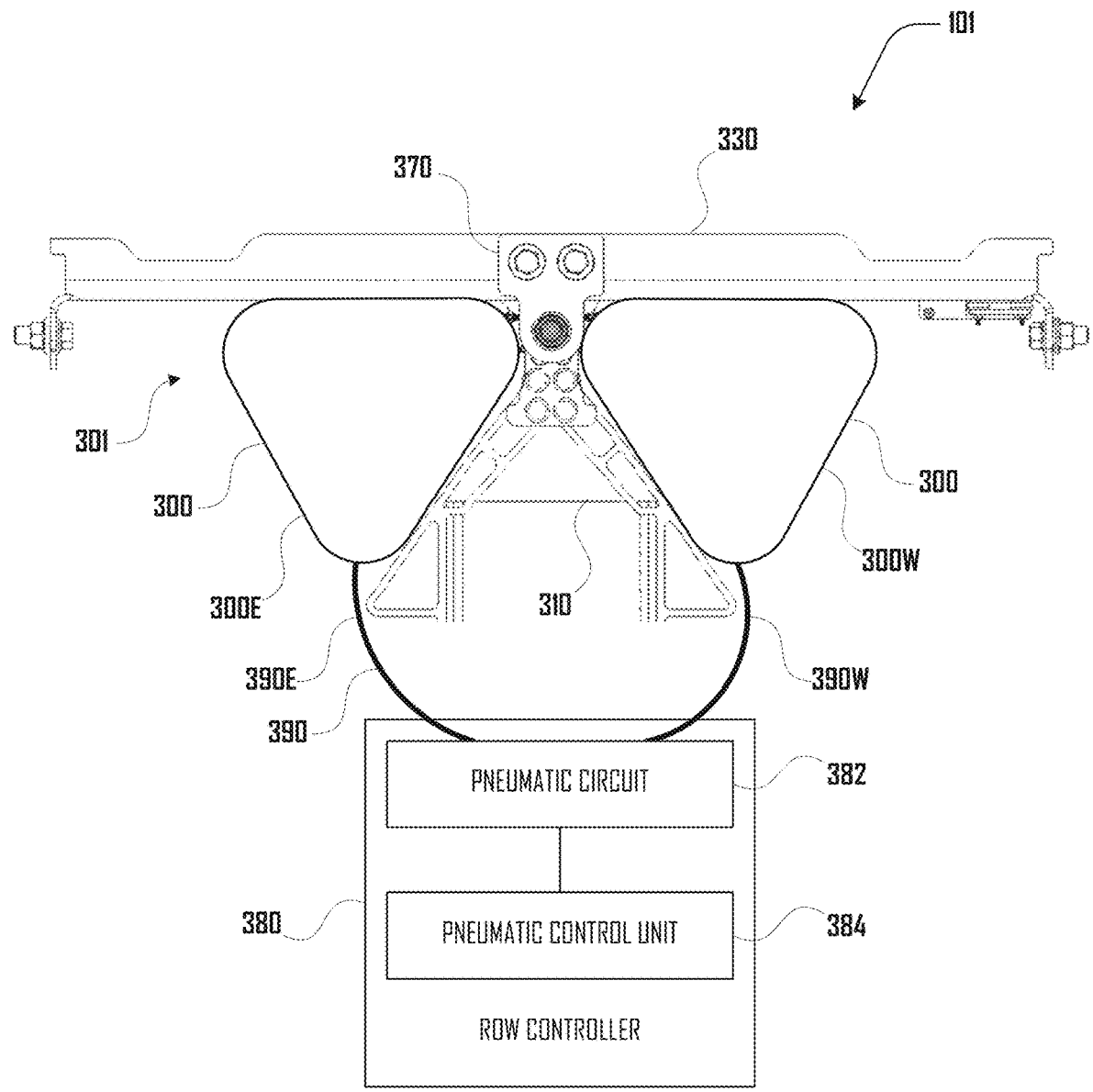
FIG. 3 illustrates a side view of an actuator in accordance with one embodiment, which comprises a V-shaped bottom plate, a planar top-plate, and a set of bellows that are disposed between the top and bottom plates.

FIG. 3 illustrates a side view of an actuator 101 in accordance with one embodiment. As shown in the example of FIG. 3, the actuator 101 comprises a V-shaped bottom plate 310, a planar top-plate 330, and a plurality of bellows 300 of a bellows assembly 301 disposed between the top and bottom plates 330, 310. A hub assembly 370 rotatably couples the bottom and top plates 310, 330 and extends between the bottom and top plates 310, 330, with the hub assembly 370.

The example embodiment of FIG. 3 illustrates the actuator 101 in a neutral configuration N (see FIG. 2), where the top plate 330 extends along axis Y, which is perpendicular to axis Z in the neutral configuration N. However, as discussed herein, the top plate 330 can be configured to tilt to the left and right (or east and west as discussed herein) based on selective inflation and/or deflation of the bellows 300 of the bellows assembly 301. Components of an actuator 101 can comprise various suitable materials, including metal (e.g., steel, aluminum, iron, titanium, or the like), plastic or the like. In various embodiments, metal parts can be coated for corrosion prevention (e.g., hot dip galvanized, pre galvanized, or the like).

A row controller 380 can be operably coupled with bellows 300 of the actuator via pneumatic lines 390. More specifically, an east bellows 300E can be coupled to a pneumatic circuit 382 of the row controller 380 via an east pneumatic line 390E. A west bellows 300W can be coupled to the pneumatic circuit 382 of the row controller 380 via a west pneumatic line 390W. A pneumatic control unit 384 can be operably coupled to the pneumatic circuit 382, which can control the pneumatic circuit 382 to selectively inflate and/or deflate the bellows 300 to move the top plate 330 of the actuator 101 to tilt photovoltaic cells 103 coupled to the top plate 330.

For example, as described herein, bellows 300 of an actuator 101 can be inflated and/or deflated which can cause the bellows 300 to expand and/or contract along a width of the bellows 300 and cause rotation of the hub assembly 370 and movement of the bottom and top plates 310, 330 relative to each other. Such movement of the hub assembly 370 can be generated when a solar tracker 100 is moving between a neutral position N and the maximum tilt positions A, B as shown in FIG. 2.

As discussed in more detail herein, a bellows assembly 301 can comprise any suitable plurality of bellows 300, with the bellows 300 being any suitable size and shape. Additionally, as discussed in more detail herein a bellows assembly 301 can comprise one or more bellows units (see, e.g., bellows unit 302 of FIGS. 5a-c) with each of the one or more bellows units comprising any suitable plurality of bellows, including in some embodiments, any suitable number of even numbers of bellows 300. As discussed herein, in some embodiments, a plurality of bellows units that each have two bellows 300 can be stacked to form a bellows assembly 301.

In various embodiments, the bellows 300 can be configured to expand along the width of the bellows 300 when fluid is introduced into the hollow bellows 300 or when the bellows 300 are otherwise inflated. Accordingly, the bellows 300 can be configured to contract along the width of the bellows 300 when fluid is removed from the hollow bellows 300 or when the bellows 300 are otherwise deflated.

Where bellows 300 are configured to expand width-wise based on increased pressure, fluid or inflation and configured to contract width-wise based on decreased pressure, fluid or inflation, movement of the photovoltaic cells 103 via one or more actuators 101 can be achieved in various ways. For example, referring to the example of FIG. 3, rotating the photovoltaic cells 103 west (i.e., to the right in this example) can be achieved via one or more of the following:

TABLE 1

Examples of Actions to Rotate Actuator 101 West

| East Bellows 300E | West Bellows 300W | Result |
|---|---|---|
| Increase Pressure | Maintain Pressure | Rotate West |
| Increase Pressure | Reduce Pressure | Rotate West |
| Maintain Pressure | Reduce Pressure | Rotate West |
| Decrease Pressure | Decrease Pressure More Than East Bellows 300E | Rotate West |
| Increase Pressure | Increase Pressure Less Than East Bellows 300E | Rotate West |

Referring again to the example of FIG. 3, rotating the photovoltaic cells 103 east (i.e., to the left in this example) can be achieved via one or more of the following:

TABLE 2

Examples of Actions to Rotate Actuator 101 East

| East Bellows 300E | West Bellows 300W | Result |
|---|---|---|
| Maintain Pressure | Increase Pressure | Rotate East |
| Reduce Pressure | Increase Pressure | Rotate East |
| Reduce Pressure | Maintain Pressure | Rotate East |
| Decrease Pressure More Than West Bellows 300W | Decrease Pressure | Rotate East |
| Increase Pressure Less Than West Bellows 300W | Increase Pressure | Rotate East |

Accordingly, in various embodiments, by selectively increasing and/or decreasing the amount of fluid within bellows 300E, 300W, the top plate 330 and photovoltaic cells 103 can be actuated to track the location or angle of the sun.

A tubular actuator assembly 101 can be a fluid driven, antagonistic type actuator. The Tubular actuator 101 can be driven by a pressurized working fluid. The working fluid can be gas, such as air, or a liquid, such as water, oil or the like.

The tubular actuator assembly 101 can work on a principle of antagonistic differential forces. For example, in an antagonistic actuator, two force-generating linear sub-actuators (e.g., bellows 300, bellows assembly 301 and/or bellows units 302) can be placed on either side of a pivot. The sub-actuators can generate forces of varying magnitudes. The extension length of the linear sub-actuator can be closely tied to a force it is generating. The sub-actuator can be said to have a "force to position" relationship. The magnitudes of the forces generated and thus the correlated length of the actuator assembly 101 can be dictated by a control system 384. The control system 384 can choose the force values for both sub-actuators. When this is completed the free component or top plate 330 of the actuator assembly 101 can rotate until the torque generated by each actuator (force multiplied by the moment arm) sums to zero. If an external torque is applied to the rotating portion (e.g., top plate 330) of the actuator assembly 101, the actuator assembly 101 can rotate until the sum of the torques, external and internal, is zero.

In some examples of a tubular actuator assembly 101, the sub-actuators can be inflated bladders or bellows 300 as discussed herein. These bladders or bellows 300 can be positioned on opposing sides of a pivot. Depending on the pressure, the controller 384 can inflate to the angle of a free plate (e.g., top plate 330) of the actuator assembly 101, the bellows 300 can supply a deterministic amount of force. The bladders or bellows 300 can apply this force given the specified angle, at a deterministic distance from the central hub assembly 370. This can create a deterministic moment applied by each bellows 300 given an angle assumed by the rotating top plate 330. All of this can result in a deterministic position given a specific control condition that can set the pressure in either bellows 300. When the pressure in both bellows 300 has been set by the control unit 384, the actuator assembly 101 can rotate until the torque (force times the moment arm) generated by both bellows 300 is equal. If an external torque is applied to the top plate 330, the actuator assembly 101 can rotate until the sum of the torques, external and internal, is zero. Given external loading conditions, the actuator assembly 101 can exhibit a deterministic "pressure to position" relationship.

Depending on how the bellows 300 are affixed to the top and/or bottom plates 310, 330 in some examples, the center of action can migrate in towards, or out away from a balance point or pivot of the hub assembly 370. As an example, when a bellows 300 is at high pressure, and on the extended side of the hub assembly 370, the contact patch, and thus the center of action of the force applied by the bellows 300, can move closer towards a center pivot of the hub assembly 370. As the top plate 330 rotates and the bellows 300 can go from an extended state to a compressed state, the contact patch can expand and the center of action can move out away from the pivot point of the hub assembly 370. A variety of actuator configurations can be devised to take advantage of this effect.

In various embodiments, the hollow bellows 300 can be configured to be inflated and/or deflated with a fluid (e.g., air, a liquid, or the like), which can cause the bellows 300 to change size, shape and/or configuration. Additionally, the bellows 300 can be deformable such that the bellows 300 can change size, shape and/or configuration.

The bellows 300 can change between a first and second configuration in various suitable ways. For example, the bellows 300 can naturally assume the first configuration when unpressurized or at neutral pressure and then can assume the second configuration via physical compression and/or a negative pressurization of the bellows 300. Additionally, the bellows 300 can naturally assume the second configuration when unpressurized or at neutral pressure and then can assume the first configuration via physical expansion and/or a positive pressurization of the bellows 300.

Additionally, the bellows 300 can be in the second configuration at a first pressurization and expand to the first configuration by pressurization to a second pressure that is greater than the first pressure. Additionally, the bellows 300 can be in the first configuration at a first pressurization and contract to the second configuration by pressurization to a second pressure that is less than the first pressure. In other words, the bellows 300 can be expanded and/or contracted via selective pressurization and/or via physical compression or expansion.

In some embodiments, it can be desirable for the bellows 300 to engage the top and/or bottom plates 330, 310 in a contacting and/or rolling manner in various configurations. In some embodiments, a contact-region of the top and/or bottom plates 330, 310 can provide for a rolling contact between convolutions of a bellows 300, which can be beneficial during movement of the bellows 300 as discussed in more detail herein. Additionally, such a contact-region can be beneficial because it can reduce strain on the bellows 300 during compression and can increase the stiffness of the bellows 300 in certain configurations.

Although certain example embodiments of bellows 300 are illustrated herein (e.g., FIGS. 5a-c, 6a-c, 20, 21a, 21b, 22a and 22b), these example embodiments should not be construed to be limiting on the wide variety of bellows shapes, sizes and geometries that are within the scope and spirit of the present invention. For example, in some embodiments, convolutions can have varying size and shape, including varying in a pattern, or the like. Additionally, the bellows 300 can have a curved or rounded contour or can include edges, square portions, or the like.

An actuator assembly 101 can move to assume a plurality of configurations based on the inflation and/or deflation of the bellows 300. For example, the actuator assembly 101 can assume a first configuration A, where a plane TO of the top plate 330 is parallel to a plane BA of the base plate 310. In this first example configuration A, the bellows 300 are of equal length and have a straight central axis CE that is perpendicular to top and bottom planes TO, BA. In such a configuration, the bellows 300 can be at a neutral pressure, partially inflated, or partially deflated. Accordingly, by selectively inflating and/or deflating the bellows 300 of the actuator assembly 101, the plane TO of the top plate 330 can be moved to various desired positions.

In some embodiments, single degree of freedom (DOF) actuators can be stacked, to achieve 2 DOF, 3 DOF or any other numbers of DOF.

The architecture of the actuator assembly 101 can take a variety of forms. One example actuator 101 assembly can comprise a top plate 330 rotatably coupled to a bottom plate 310. The bottom plate 310 is then rigidly coupled to a post 104, frame or any other suitable substrate. Inflatable, flexible sub-actuators, bladders, or bellows 300 can be disposed on either side of the coupling. When inflated differentially, the bellows 300 can rotate the top plate 330 to a specific position. This example architecture can be modified in any suitable manner.

In one embodiment, a top plate 330 can be rotatably coupled to a bottom plate 310 in the shape of an inverted V. The bellows 300 can engage with the top plate 330 on the underside of its wings and with legs 311 of the V-plate bottom plate 310. The V-plate can take any suitable angle to achieve the desired range of motion, stiffness or any other behavior or performance. In some embodiments, it can be desirable for the V plate angle to be 90 degrees. For greater range of motion, the V-Plate can have an angle less than 10 degrees. For greater stiffness, the actuator assembly 101 can have a bottom plate angle greater than 120 degrees. In some embodiments, it can be desirable to have a bottom plate angle at the extremes, 180 degrees, flat, where bellows 300 press on the wings of the plate on either side of the coupling. It can also be desirable in some examples to have a plate with an angle of 0 degrees. In some examples, the bottom plate 310 can more aptly be called a middle plate, in that the bellows 300 can act on either side of the thin plate, rather than on opposing lobes. Likewise, the top plate 330 can take a V-shape and can be configured in any angle (e.g., FIGS. 15b, 17a-c, 18 and 19). The V-shape in either plate 310, 330 can also be inverted in some examples. An actuator assembly 101 can comprise any combination of top and bottom plates 310, 330.

Another embodiment can comprise an A-frame that is rigidly affixed to a mounting substrate. A center plate can be rotatably coupled to the center of the A-frame. The bellows 300 can mount to engage with either side of the center plate. The bellows 300 can be attached to a coupling point by a web or fascia attached to the bellows 300. The bellows 300 can also be affixed to either the frame or the center plate.

Turning to FIG. 4, in various embodiments, a plurality of solar trackers 100 can be actuated by a row controller 380 in a solar tracking system 400. In this example, four solar trackers 100A, 100B, 100C, 100D can be controlled by a single row controller 380, which is shown being operably coupled thereto. As described in more detail herein, in some examples, a plurality of trackers 100 or a subset of trackers 100 can be controlled in unison. However, in further embodiments, one or more trackers 100 of a plurality of trackers 100 can be controlled differently than one or more other trackers 100.

While various examples shown and described herein illustrate a solar tracking system 400 having various pluralities of rows of trackers 100, these should not be construed to be limiting on the wide variety of configurations of photovoltaic panels 103 and fluidic actuators 101 that are within the scope and spirit of the present disclosure. For example, some embodiments can include a single row or any suitable plurality of rows, including one, two, three, four, five, six, seven, eight, nine, ten, eleven, twelve, fifteen, twenty, twenty five, fifty, one hundred, and the like.

Additionally, a given row can include any suitable number of actuators 101 and photovoltaic panels 103, including one, two, three, four, five, six, seven, eight, nine, ten, eleven, twelve, fifteen, twenty, twenty five, fifty, one hundred, two hundred, five hundred, and the like. Rows can be defined by a plurality of physically discrete tracker units. For example, a tracker unit 100 can comprise one or more actuators 101 coupled to one or more photovoltaic panels 103.

In some preferred embodiments, the axis of a plurality of solar trackers 100 can extend in parallel in a north-south orientation, with the actuators 101 of the rows configured to rotate the photovoltaic panels about an east-west axis. However, in further embodiments, the axis of trackers 100 can be disposed in any suitable arrangement and in any suitable orientation. For example, in further embodiments, some or all rows may not be parallel or extend north-south. Additionally, in further embodiments, rows can be non-linear, including being disposed in an arc, circle, or the like. Accordingly, the specific examples herein (e.g., indicating "east" and "west") should not be construed to be limiting.

Also, the rows of trackers 100 can be coupled to the ground, over water, or the like, in various suitable ways, including via a plurality of posts. Additionally, while various embodiments described herein describe a solar tracking system 400 configured to track a position of the sun or move to a position that provides maximum light exposure, further examples can be configured to reflect light to a desired location (e.g., a solar collector), and the like.

Figure 5A:
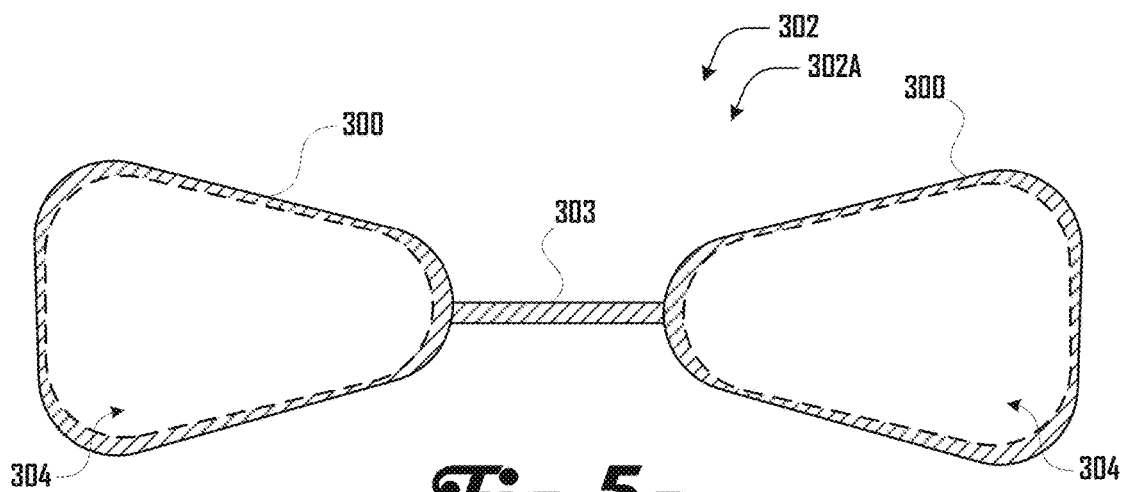
FIGS. 5a, 5b and 5c illustrate side cross-sectional views of a bellows unit in accordance with different embodiments.
Figure 5B:
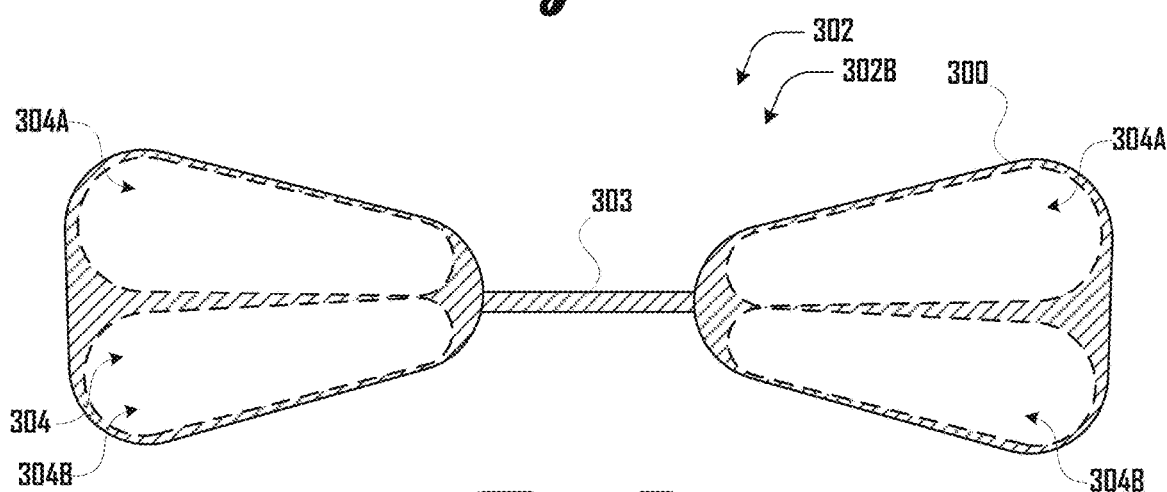
Figure 5C:
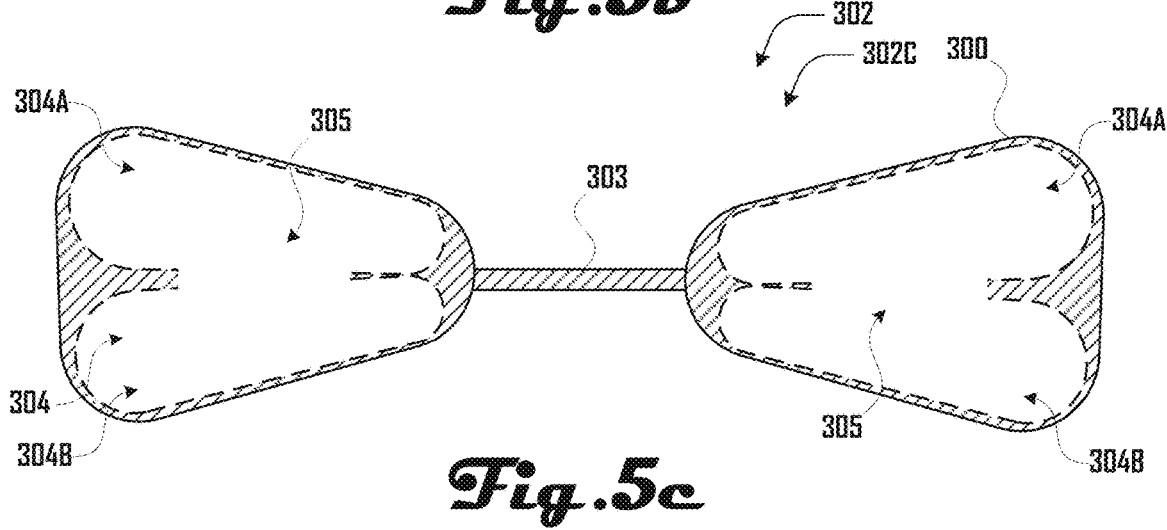

Turning to FIGS. 5a-c, three example embodiments 302A, 302B, 302C of a bellows unit 302 are illustrated. As shown in FIGS. 5a-c, a bellows unit 302 can comprise a pair of bellows 300 that are coupled via a web 303, with each of the bellows 300 defining one or more bellows cavity 305. For example, FIG. 5a illustrates a bellows unit 302A comprising a pair of bellows 300 connected via a web 303 with the bellows 300 defining a respective and separate single bellows cavity 304. FIG. 5b illustrates a bellows unit 302B comprising a pair of bellows 300 connected via a web 303 with the bellows 300 defining a respective and separate first and second bellows cavity 304A, 304B. FIG. 5c illustrates a bellows unit 302C comprising a pair of bellows 300 connected via a web 303 with the bellows 300 defining a respective first and second bellows cavity 304A, 304B that are connected via a port 305 that allows for fluid to pass between the bellows cavities 304A, 304B.

While three examples 302A, 302B, 302C of a bellows unit 302 are illustrated, this should not be construed to be limiting on the wide variety of further embodiments of a bellows unit that are within the scope and spirit of the present disclosure. For example, further embodiments can include bellows 300 having any suitable plurality of cavities 304 (e.g., three, four, five, ten, twenty, and the like).

Additionally, in various embodiments, the bellows unit 302 can comprise one or more plane of symmetry. For example, as shown in examples 302A, 302B, 302C of FIGS. 5a-c, a bellows unit can include a first plane of symmetry that extends vertically through the web 303; and can include a second plane of symmetry that extends horizontally through the web 303 and the bellows 300 and can include a third plane of symmetry that extends vertically through the web 303 and the bellows 300. In some embodiments, one or more of such planes of symmetry can be absent.

Also, in various embodiments, the bellows 300 can have a shape such that the bellows 300 become increasingly thicker from the web 303 outward as shown in FIGS. 5a-c and then thinner toward a terminal end. However, the bellows can have various suitable shapes and sizes in further embodiments. For example, in some examples, the bellows can comprise convolutions, ribs, or the like.

Figure 6A:
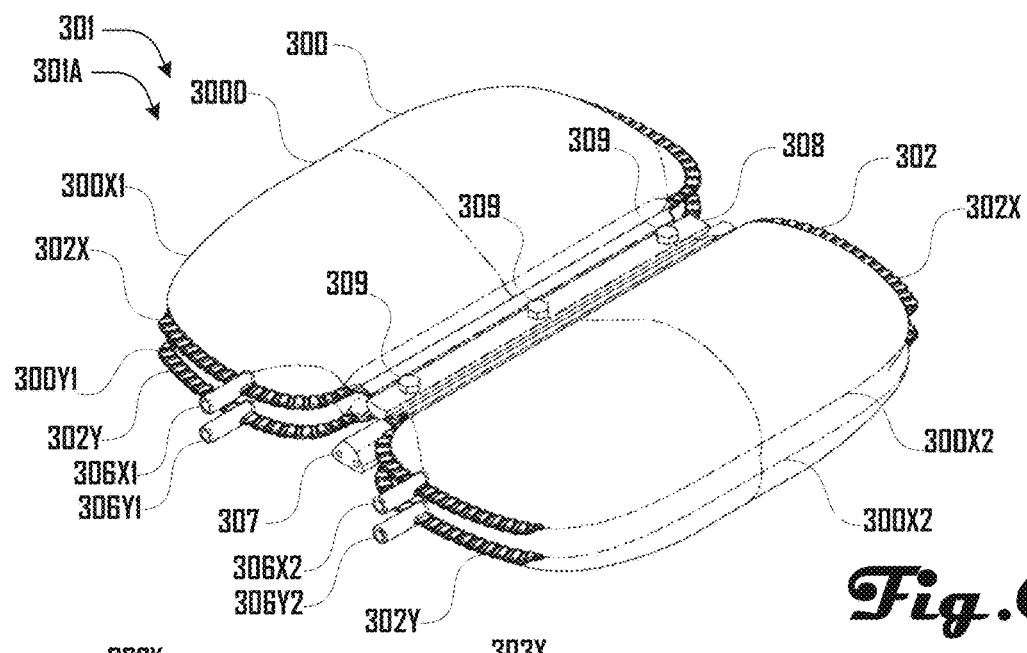
FIGS. 6a, 6b and 6c illustrate perspective, side and top views of a bellows assembly in accordance with an embodiment.
Figure 6B:
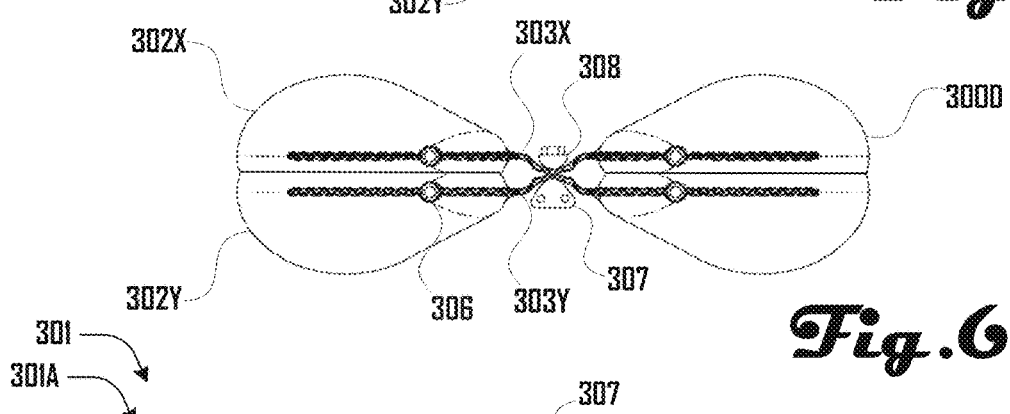
Figure 6C:
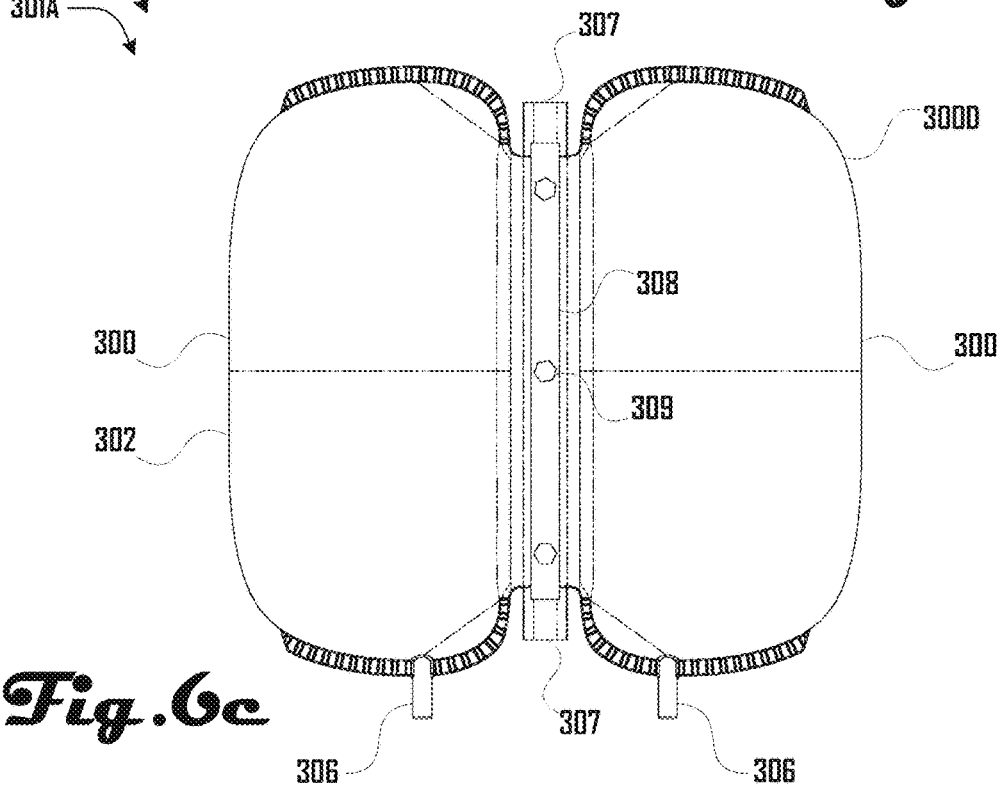

Turning to FIGS. 6a-c, one embodiment 301A of a bellows assembly 301 is illustrated that comprises a first and second bellows unit 302X, 302Y. As shown in this example embodiment 301A, the first bellows unit 302X comprises a first and second elongated tubular bellows 300X1, 300X2 that are coupled via a first web 303X and a second bellows unit 302Y comprises a first and second bellows 300Y1, 300Y2 that are coupled via a second web 303X.

The first and second bellows units 302X, 302Y are shown stacked and coupled together via elongated top and bottom clamp-down bars 307, 308 disposed at and extending along a length of the webs 303 of the bellows units 302. More specifically, the top clamp-down bar 308 is disposed abutting the first web 303X of the first bellows unit 302X with the bottom clamp-down bar 307 disposed abutting the second web 303Y of the second bellows unit 302Y. The top and bottom clamp-down bars 307, 308 are coupled via bolts 309 that extend through the webs 303.

As shown in the example of FIGS. 6a-c, the portions of the top and bottom clamp-down bars 307, 308 that engage the webs 303 of the bellows units 302 can have a rounded profile, which can be desirable for being less likely to damage and introduce failure points to the webs 303; however, in further examples, the top and bottom clamp-down bars 307, 308 can have any suitable profile. Also, top and bottom clamp-down bars 307, 308 can be coupled together in various suitable ways in addition to or as an alternative to bolts 309.

The first and second bellows units 302X, 302Y further comprise ports 306 that communicate with cavities 304 (see, e.g., FIGS. 5a-c) defined by the bellows 300. For example, the first bellows unit 302X comprises a first port 306X1 associated with the first bellows 300X1 and a second port 306X2 associated with the second bellows 300X2. The second bellows unit 302Y comprises a first port 306Y1 associated with the first bellows 300Y1 and a second port 306Y2 associated with the second bellows 300Y2. All of the ports 306 are shown disposed on the same side of the bellows assembly 301A. For example, the first bellows unit 302X comprises a first port 306X1 associated with the first bellows 300X1 and a second port 306X2 associated with the second bellows 300X2. The second bellows unit 302Y comprises a first port 306Y1 associated with the first bellows 300Y1 and a second port 306Y2 associated with the second bellows 300Y2. All of the ports 306 are shown disposed on the same side of the bellows assembly 301A.

The first and second bellows units 302X, 302Y can be configured in various suitable ways, including configurations 302A, 302B, 302C, shown in FIGS. 5a-c, or any other suitable configuration. Also, while the example bellows assembly 301A of FIGS. 6a-c has two bellows, units 302, further examples can include any suitable plurality of bellows units 302 or can have a single bellows unit 302.

Although certain example embodiments of an actuator assembly 101 shown herein comprise a specific number of bellows 300 (e.g., four, two, one, zero), these examples should not be construed to be limiting on the wide variety of configurations of an actuator assembly 101 that are within the scope and spirit of the present invention. For example, various embodiments of an actuator assembly 101 can include any suitable plurality of bellows 300 (e.g., 3, 5, 6, 7, 8 or more); can include a single bellows 300; or bellows 300 can be absent. The orientation of the bellows 300 and the direction of the force they exert can also change. Rotational motion of an actuator assembly 101 can be accomplished with bellows 300 providing a force that is not parallel and in the same direction, but the bellows 300 can be oriented on the same side of a pivot point of the rotational actuation, so that the forces are parallel but in opposite directions, or the bellows 300 can be oriented so that they are offset 90 degrees from the pivot point, so that the forces are perpendicular, or in many other orientations where the moments created by each bellows 300 in an actuator assembly 101 are in different directions.

A bellows 300 (or a bladder, or the like) can be made of any suitable material, including polymers, copolymers, terpolymers, and polymer blends (both miscible and immiscible), thermoplastic elastomers, and the like. For example, a bellows 300 can comprise plastics, elastomers, thermoset polymers, thermoplastics, thermoplastic elastomers, copolymers, terpolymers, block copolymers, graft copolymers, polymer composites, and both miscible and immiscible polymer blends. Specific examples include high-density polyethylene (HDPE), cross-linked polyethylene (PEX), polypropylene (PP), low-density polyethylene (LDPE), polyethylene terephthalate (PET), polyethylene naphthalate (PEN), polystyrene (PS), polyetherimide (PEI), polyphenylene ether (PPE), thermoplastic polyurethane (TPU), thermoplastic elastomers (TPE), polycarbonate, acrylic, nylon, and the like.

In some embodiments it can be desirable for a bellows 300 to comprise one or more ultra-violet (UV) stabilizers, UV-absorber, anti-oxidant, thermal stabilizer, hydrolysis stabilizer, carbon black, glass fill, fiber reinforcement, electrostatic dissipater, lubricant concentrate or the like. Materials of the bellows 300 can be selected based on a desired manufacturing technique, bellows strength, bellows durability, range of motion, compliance, sun-resistance, temperature resistance, wear resistance, fatigue resistance and the like. In some embodiments, where the bellows 300 is employed in a location that experiences sun exposure, it can be desirable to include a protective UV coating or UV stabilizer in the bellows 300.

While some embodiments of the bellows 300 can only comprise a single layer, others can comprise a plurality of layers. For example, the thickness of a bellows 300 can comprise three layers. An inner layer can be constructed of thin impermeable layer of thermoplastic elastomer that is flexible and holds pressure when inflated. A middle layer can comprise a structural layer constructed of a biaxially stretched PET or other material capable of higher tensile loads. Such a layer can provide structural integrity or aid in the restraint of the bladders. A third, external layer can comprise a carbon black doped HDPE to protect against UV, wind-blown sand abrasion, or other environmental irritants. In this sense, the external layer can act as a shielding layer. An external layer can also act as a sacrificial layer. The outer layer can also exhibit other special properties, such as low coefficient of friction, special texture, or desirable optical or aesthetic properties that can enhance the performance or value of the product. In other embodiments, a bellows 300 can be made of two or more materials in sequence. For example, one embodiment can comprise a bellows 300 with sequentially alternating HDPE and PP convolutions, or the like. A bellows 300 can comprise any suitable constructions with the purpose of offloading particular functions or requirements of the bellows 300 to different layers while keeping aggregate costs down. Bellows 300 can include strengthening or protective shrouding.

A bellows 300 can be made via any suitable manufacturing process, including extrusion blow-molding (EBM), injection stretch blow-molding (ISBM), multi-layer blow-molding, co-extrusion blow molding, co-injection blow molding, suction blow-molding, 3D blow-molding, sequential co-extrusion blow-molding, vacuum forming, injection molding, thermoforming, rotational molding, process cooling, three-dimensional printing, dip modeling, hydroforming, plastic welding or the like.

Multilayer bellows 300 can be constructed by any suitable manufacturing processes, including: co-extrusion, sequential co-extrusion, co-extrusion blow molding, glue lamination, heat lamination, fabric wrapping, filament winding and any other manner of manufacturing. In some embodiments bladders can be manufactured from sheet material. In these embodiments, fabric or plastic sheeting can be sewn, heat welded, ultrasonically welded, laser welded, glued laminated, clamped or bonded by any other suitable manufacturing processes.

Flexible bellows 300 can have fabric or fiber reinforcement. Such incorporations can afford a bellows 300 with enhanced tensile strength or wear properties, while preserving flexibility and function. Enhanced tensile strength from fiber reinforcement can allow for greater factors of safety, increased operating pressures and associated stiffness, longer fatigue life, enhanced resistance to puncture, and generally boosted durability.

Fiber reinforcement can be incorporated via filament winding, sewn fabric shrouding, extrusion-coated fabric. Fiber reinforcement can be directly incorporated into the bellows 300, for example, as an additive to plastic extrusion. Fiber reinforcement can be incorporated into a bellows 300 through the welding, fusing or laminating of a fabric or fibered layer to a plastic or elastomeric bladder wall. Fiber reinforcement can also be indirectly incorporated. For example, a fabric sheet can be wrapped around a hermetic bladder and then secured to actuator plates. An architecture of this nature can, in some examples, reinforce and strengthen the bladder while simultaneously affixing it to the rigid plate components.

In some embodiments, multiple bellows 300 can be formed as a single part. In some manufacturing processes multiple bellows 300 chambers can be joined by a connecting fascia. Manufacturing processes in which such a construction could be formed include, but are not limited to, extrusion blow molding, injection stretch blow molding, fabric sewing, injection molding, and dip molding.

In one such embodiment, a two-chambered bellows 300 can be formed through extrusion blow molding. An oversized tube of molten plastic can be extruded, a two-chambered mold can be closed around it, and the chambers can be pressurized to set the part shape. The resulting part can have two independent chambers connected at the center by a solid plastic fascia. The independent chambers can each have in-molded barb tubes for pneumatic connections, or can have molded features that enable attachment of another appropriate connection type. This method of manufacture can also place features such as weld or pinch lines in ideal areas, where operation stress and strain can be minimized. The material connecting the chambers of the bellows 300 can be thicker than the chambers of the bellows and capable of taking high tensile loads. For example, the material connecting the chambers of the bellows 300 can be twice as thick as the chambers of the bellows 300. In some actuator architectures, a connecting web 303 of a bellows unit 302 can be slung over the pivot ridge 312 on the bottom plate 310, or any other suitable attachment point in the actuator assembly 101. This web 303, in some examples, can act as a constraint, affixing the bellows 300, and obviating the need for a secondary or external method of bellows constraint.

A similar bellows 300 construction can be achieved by sewing fabric. A fabric sheet can be folded and sewn in such a way to create independent bellows 300 chambers, as well as a connecting web 303.

Parts with a plurality of bellows chambers can also be made so that the chambers are not independent of each other. In such an embodiment, two chambers can be connected to each other by a tube, channel, pillow plate bead, or any other feature that allows for unimpeded fluid flow between the chambers. Such a construction can be useful in actuator architectures that utilize stacked bellows 300. In this architecture, a multi-chamber bellows 300 can be folded such that one bellows 300 resides on top of the other on one side of the actuator pivot ridge 312. A similar architecture can be found on the other side of the pivot ridge 312. A channel between the chambers of the bellows 300 that allows for fluid flow can generate equal pressurization of both chambers and can obviate the need for separate fluid connections to the chambers in some examples.

Bellows 300 can be any suitable thickness in various portions, including about between 0.002 inches and 0.125 inches, and about between 0.0005 inches and 0.25 inches. In various embodiments, the thickness of various portions of the bellows 300 can be selected based on a desired manufacturing technique, bellows strength, bladder durability, range of motion, compliance, sun-resistance, temperature resistance, and the like.

Embodiments of the actuator assembly 101 can comprise bellows 300 of various shapes and sizes. For example, FIGS. 5a-c, 6a-c, 20, 21a, 21b, 22a and 22b illustrate some example embodiments 300A, 300B, 300C, 300D, 300E, 300F, 300G, 300H and 300J of a bellows 300, but these examples should not be construed to be limiting. Additionally, any of the internal structures of embodiments 300A, 300B and 300C can be present in embodiments 300D, 300E, 300F, 300G, 300H and 300J or other embodiments.

A bellows 300 can be designed to have one of a variety of diameters. The diameter of a bellows 300 incorporated into an actuator assembly 101 can dictate the pressure-to-position relationship achieved by the actuator assembly 101. In some embodiments, a small diameter can be chosen to optimize for cost or packing efficiency. In other embodiments a large diameter can be chosen to optimize for strength, stiffness and dynamic performance.

A bellows 300 can be designed to be of any length. For bellows 300 having shapes with an extended or extruded body section, the body section can be of any length. A bellows 300 with a short body section can approximate a sphere. A bellows 300 with a longer body section can have a pill shape or a noodle shape. A body of a bellows 300 can be extended indefinitely and take the form of a true tube or hose.

A bellows 300 can be designed to have one of a variety of fundamental shapes. Some embodiments can feature a bellows 300 that comprises an extruded form body. The extruded cross-section can be circular, oval, teardrop-shaped, have convoluted lobes or take on any extrudable profile. In some embodiments, a bellows 300 may not have a defined body section. In these embodiments the boundary between body and cap can be blurred. Some examples of bellows 300 in this category can be cone-shaped, tapered, spherical, kidney bean-shaped, incorporate convolutions, or have some other amorphous shape.

A body section of bellows 300 can be terminated at either end with caps. Caps of a bellows 300 can take on various shapes depending on the application. The terminations or end caps on the bellows 300 can take a variety of shapes, including hemispheres, truncated cones, right cones, oblique cones, convoluted bladder, ellipsoid, or the like.

In some embodiments, features can be formed into bellows 300 during the molding process. Such features can include, but are not limited to, locating bosses, hard stops, convolutions, tubing, pneumatic connectors, and the like. In other embodiments, features can be attached to bellows 300 in any number of suitable manners. Attachment methods can include hot plate welding, ultrasonic welding, heat sealing, gluing, press fitting, or a variety of other methods.

In some examples a tube/bulbous bellows 300 can be desirable over other types of inflatable fluidic actuators. The following provides some examples of potential benefits of some embodiments.

Stronger Pressure to Position Relationship—A large areal change can generate a stronger pressure to position relationship (>>Δ psi/Δ degree). In some embodiments, this not only means greater static stiffness, but can also generate better accuracy (e.g., actual angle to command angle), and/or intra-tracker precision (e.g., tracker to tracker consistency). Some examples can include hysteresis and accuracy that is less dependent on recent actuator positional history. Further examples can have better leak tolerance (e.g., positional stability given a leak rate).

Better Static Stiffness—Due to the large areal change from the compressed to extended positions in some examples, as well as a change in effective moment arm over the full range of motion, a tube actuator of some examples can provide 2-5× the static stiffness of other types of actuators. If static stiffness is a limiting factor in some examples (e.g., interior tracker), this can mean the actuator can be tolerant to increased load and allow more W/Actuator in some examples.

Reduced Compressed Air Burden—In some examples, a tubular actuator operating at the same peak pressure as an alternative fluidic actuator design may exhibit substantially reduced compressed air consumption while retaining at least the same dynamic stiffness as other types of bellows 300. This can reduces the parasitic power loss, can decrease the needed compressor output (e.g., per 2 MW array) and can also increase the number of actuators per row controller (e.g., if stow or another fill related metric can be limiting).

Simpler Pivot Solution—In some examples, a bellows-based actuator can utilize a pure pivot instead of a bending wire rope flexure. In some embodiments, a simple pivot design can enable the inclusion of a viscous damper; however, in some embodiments, a viscous damper may not be included on every actuator in every tracker, but can be used in various situations (e.g., exterior trackers) to deal with excessive wind/dynamic loads, and the like.

Lower Payload Center of Mass—In some embodiments, a simple pivot can enable a low center-of-mass design. An actuator assembly 101 configured with a lower center-of-mass can take a greater payload while keeping performance constant, compared to other types of actuators.

Less Complexity—In some examples, tube actuator constraints can be less complex and embody less material than constraints in other actuator systems. Accordingly, in various embodiments, the assembly part count of bellows actuators can be greatly reduced compared to other actuator systems.

Efficient Plate Geometries—Actuator configurations of some embodiments of a bellows actuator can allow the top and bottom plates 310, 330 to take more efficient shapes compared to other actuator systems. Plates 310, 330 can be designed to be bent at high angles to make use of compressive and tensile elements that effectively and efficiently bear the antagonistic forces with less material.

Enhanced Bladder Protection—Various bellows actuator configurations can better protect pneumatic bellows from UV, blown sand and accidental puncture (e.g., during installation or maintenance) compared to other actuator systems.

Improved Moldability—In various examples, tube bellows can be much easier to blow mold compared to other actuator systems. For example, cylinders can be the easiest thing for some molders to process. This can mean that various examples of tube bellows can have less value-added cost and better average quality (e.g., better material distribution/low thickness variation) compared to other actuator systems.

Reduced Part Weight—Compared to some other actuator systems, a bellows can comprise about one-quarter to one-eighth less material. In addition to the material savings, the lower part weight can also result in reduced molding cycle times. Cycle times of bellows actuator systems can be on the order of 15-30 seconds, as opposed to 80-110 seconds for other actuator systems. This can mean less value added per part and more annual output per mold for some embodiments of bellows actuators.

Fiber Reinforcement—In some examples, cylindrical bellows, or the like, can be desirable for fiber incorporation. For example, filament winding, fabric wrapping, and the like can be used in bellows of bellows actuators. Fiber reinforcement can allow for increased operating pressures, greater durability/resistance to puncture, a reduction in expensive engineered materials per molded part, and the like.

Figure 7A:
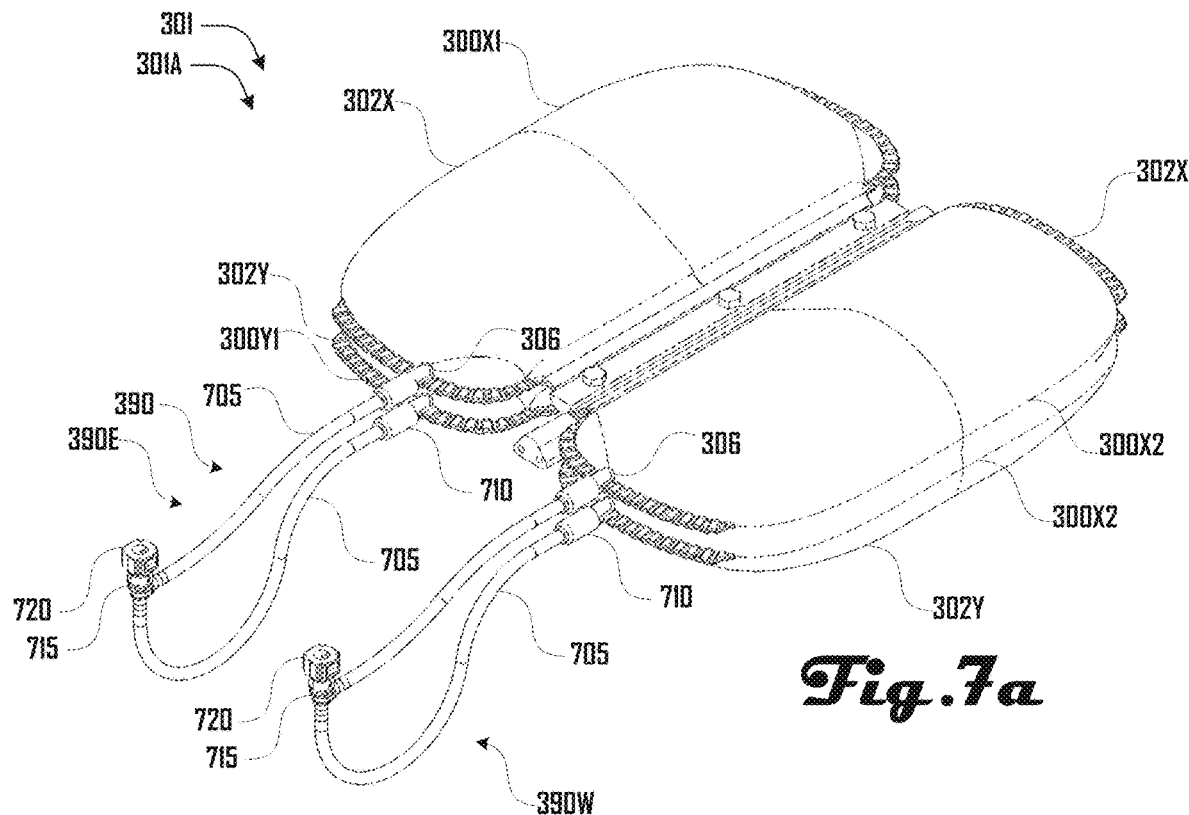
FIGS. 7a and 7b illustrate a perspective and a side view of a bellows assembly and fluidic lines in accordance with an embodiment.
Figure 7B:
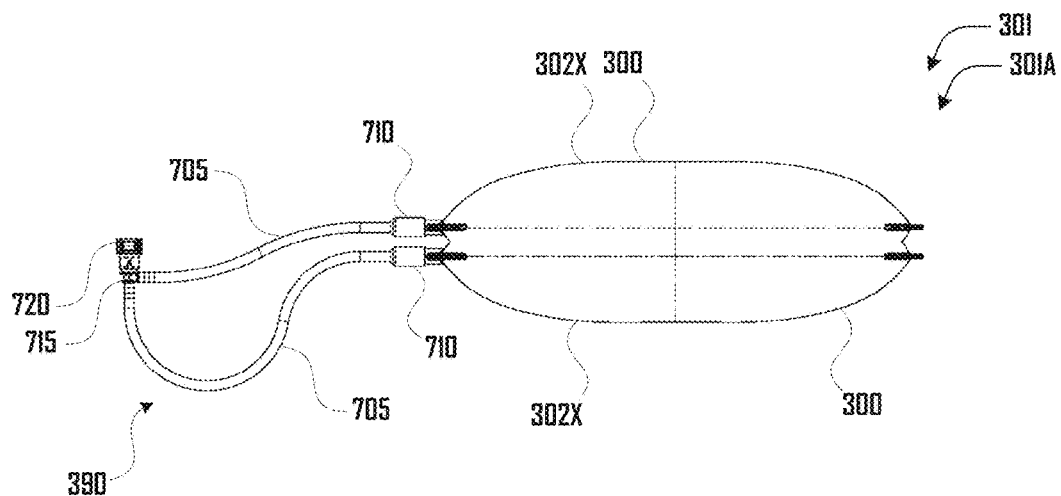

Turning to FIGS. 7a and 7b, the bellows assembly 301 of FIGS. 6a-c is shown with pneumatic lines 390 coupled to ports 306 of the bellows 300. More specifically, a pair of pneumatic lines 390E, 390W are shown with each comprising lines 705 that are coupled to respective ports via crimps 710 at a first end of the lines 705. A second end of the lines 705 are coupled to a Y-connector 715 that communicates with a coupler 720. The east pneumatic lines 390E are coupled to the first bellows 300X1, 300Y1 of the first and second bellows units 302X, 302Y and the west pneumatic lines 390W are coupled to the second bellows 300X2, 300Y2 of the first and second bellows units 302X, 302Y.

As discussed herein, the pneumatic lines 390 can provide for fluid being introduced to and/or removed from the bellows assembly 301 to move an actuator assembly 101 as discussed herein (see, e.g., FIGS. 2 and 3). For example, the east pneumatic lines 390E can allow the first bellows 300X1, 300Y1 to be inflated and/or deflated in unison. In various embodiments, the east pneumatic lines 390E are configured to provide the same amount of fluid and the same fluid pressure to the first bellows 300X1, 300Y1. Similarly, the west pneumatic lines 390W can be configured to provide the same amount of fluid and the same fluid pressure to the second bellows 300X2, 300Y2. For example, the coupler 720 of the east pneumatic lines 390E can be fluidically coupled to a first fluid source that controls the first bellows 300X1, 300Y1, and the coupler 720 of the west pneumatic lines 390W can be fluidically coupled to a second fluid source that controls the second bellows 300X1, 300Y1.

FIG. 8 illustrates a close-up side view of ports 306 and couplers 710 of the bellows assembly 301A of FIGS. 6a, 6b, 7a and 7b. Tubing 705 is shown coupled to ports 306 of bellows 300 via a barbed fitting 711 disposed within ends of the tubing 705 and ports 306 with crimps 710 locking the fittings 711 to the ports 306. FIGS. 7a, 7b and 8d illustrate example embodiments of how pneumatic lines 390 can be coupled to a bellows assembly 301; however, in further embodiments, pneumatic lines 390 can be coupled to a bellows assembly 301 in various other suitable ways.

Various examples can include use of interference fit barbed fittings pressed into blow-molded bladders. Various examples can include a pneumatic architecture, including: Harness tube branch→orifice connector→Y connector→2× tube to top bladder.

In some examples, locating the flow limiting orifice on the harness side of the Y connector results in twice the flow through the orifice relative to putting orifices on the bladder side. This can enable greater flow restriction from the same orifice geometry.

Flow restriction devices can include any suitable device or structure. For example, a restrictor can comprise a body that defines a fluid passage having a pair of ports that provide for entry and/or exit of fluid into the fluid passage. Another example can include a coiled fluid passage. A further example can include a serpentine fluid passage. In various embodiments, such a restrictor can be a portion of a bladder, cap, or the like. In other embodiments, a restrictor can comprise a multi-layer fluid passage, or the like.

Turning to FIGS. 9a and 9b, a perspective and side view of a top plate 330 with top portions 372 of a hub assemblies 370 disposed on opposing sides of the top plate 330. The top plate is shown comprising a planar and rectangular slab 331 with rims 333 extending perpendicularly from the slab 331 and with the rims 333 extending parallel to each other. The slab 331 and rims 333 define a tray 335 having open ends. Hub assembly top portions 372 are coupled to opposing sides of the top plate 330 on external sides of the rims 333, with the hub assembly top portions 372 extending below a plane of the slab 331.

The hub assembly top portions 372 can comprise at least a portion of a shoulder bolt 374, which can rotatably couple with hub assembly bottom portions 376 (See, e.g., FIGS. 10a, 10b, 11a, 11b) to define a hub assembly 370.

Figure 10A:
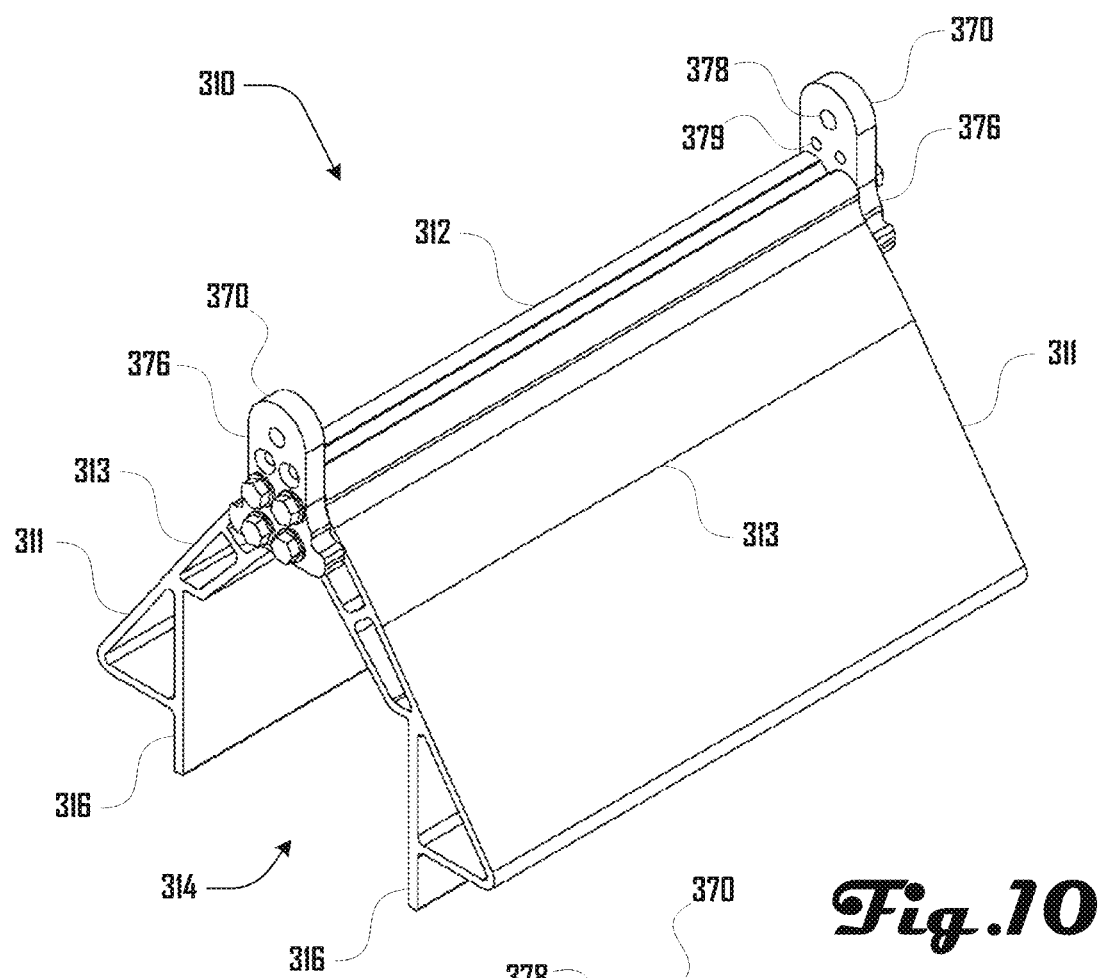
FIGS. 10a and 10b illustrate a perspective view and a side view of a bottom plate in accordance with an embodiment an in a first configuration.
Figure 10B:
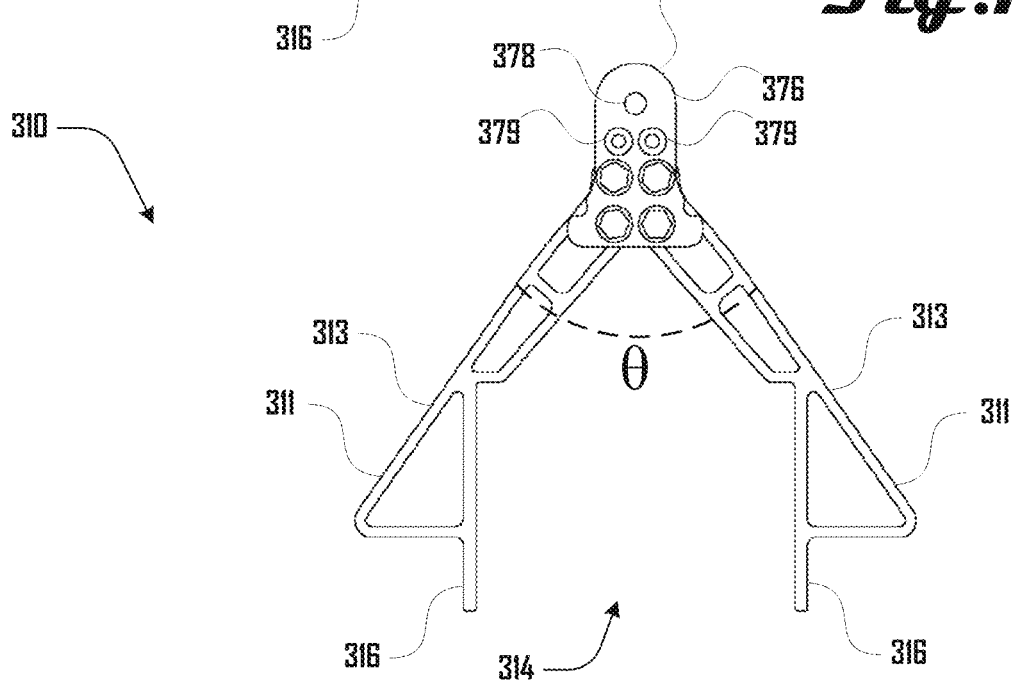

Turning to FIGS. 10a and 10b, a perspective and side view the bottom plate 310 of FIG. 3 is illustrated which comprises a pair of arms 311 that extend from a ridge 312 where the arms 311 are coupled to hub assembly bottom portions 376. The arms 311 define faces 313 on which bellows 300 of bellows assemblies 301 can bear against to move the actuator 101 as discussed herein (see, e.g., FIGS. 2 and 3). The arms 311 can further define a slot 314 that is defined by sidewalls 316 of the arm 311. In various embodiments, the slot 314 and sidewalls 316 can be configured to couple with various structures such as a post, or the like, which can serve as a stand or support for the actuator assembly 101 and tracker 100 (see, e.g., FIGS. 1 and 2).

The hub assembly bottom portions 376 can include a bolt hole 378 that can comprise or engage with a shoulder bolt 374 (FIGS. 9a, 9b) such that the bottom plate 310 can be rotatably coupled with the top plate 330 via the hub assembly 370 defined by the top and bottom hub assembly portion 372, 376.

Additionally, the hub assembly bottom portions 376 can include one or more coupling holes 379, which can provide a location for a bellows assembly 301 to couple with the base plate 310. While a hub assembly 370 defined by top and bottom hub assembly portions 372, 376 and including a shoulder bolt 374 is shown in various examples, further embodiments can include various suitable structures to couple the top and bottom plates 310, 330 such that the top and bottom plates 310, 330 can move relative to each other by inflation and/or deflation of bellows 300 of a bellows assembly 301 having one or more bellows units 302.

For example, in some embodiments, the hub assembly 370 can comprise a joint, a pivot, a hinge, a bending flexure, a linkage, or another suitable mechanism or form of attachment.

In some embodiments, a hub assembly 370 can comprise pivot or an axle seated in bearing or bushing and can be employed to connect the mount to the payload. An actuator assembly 101 can comprise a single hub assembly 370, or a plurality of hub assemblies 370. Hub assemblies 370 can be cantilevered, supported on both sides, or have any other suitable construction. An axle component of a hub assembly 370 can be a hardened steel shaft, a flanged clevis pin, a shoulder bolt, or any other type of axle. An axle can be threaded on one or both ends and screwed into a threaded hole, or fastened with a nut and washer assembly. The axle can be fastened with shaft clamps or any other securement method for smooth shafts. Additionally, a shaft can have any number of features formed into it to aid fastening, or location of assembly components. Some such features can include girdling grooves for circlip fasteners, transverse holes for securement by cotter pin, set screw or twisted wire, or shaft shoulders, for locating other assembly components or features.

A bearing component of a hub assembly 370 can include a ball bearing, a sleeve bushing or any other species of bearing. The bearing can be constructed of metal, included, but not limited to, steel, copper, brass, bronze, as well as plastics, including, but not limited to, acetal, HDPE, nylon, and Teflon. The bearing can also be some combination of materials, or made of oil impregnated or alloyed material.

In some embodiments, a hub assembly 370 can comprise a flexure to attach the payload to the base or to connect top and bottom plates 310, 330 of an actuator assembly 101. A flexure, or flexible/bending connector, can take a variety of forms in various examples. A flexure can be constructed of metal sheets or twisted strands such as spring steel sheets flexures, wire rope, or springs, or the like. A flexure can take any suitable length. Metal flexures can also comprise assemblies of metal flexure components such as crossed or angled wire rope, spring steel crosses or the like.

A wire rope can be used as a flexure. The flexure can hold the actuator plates 310, 330 together under tensile load, while still allowing for rotation of the free plate relative to the fixed plate. The wire rope can be made of any suitable material and can have any suitable strand and bundle configuration. The flexure can be coupled via a Nicopress fitting, via swaging, via a Spelter socket, or the like.

In further embodiments, a flexure for a single-axis actuator assembly 101 can comprise a parallel rope flexure, a planar flexure, a load bearing pivot, a four-bar linkage, a tetrahedral linkage, or the like. Such flexures can comprise any suitable material, including a metal, plastic, fiber reinforced composite, or the like.

For example, an embodiment of an actuator assembly 101 can comprise a flexible planar flexure that extends between a bottom and top plate 310, 330. Another embodiment of an actuator assembly 101 can comprise a flexible tetrahedral linkage defined by a rope that extends between a bottom and top plate 310, 330. A further embodiment of an actuator assembly 110 can comprise a pivot that extends between a bottom and top plate 310, 330.

An actuator assembly 101 can also comprise snap-in connections, twist-in connections, one-way push-in barb connections, toggle locks or any other suitable mechanism or connection to facilitate quick and inexpensive assembly of an actuator assembly 101.

In some embodiments, a 2-degree-of-freedom actuator can be employed. The corresponding attachment method can comprise a universal joint, a spring, a spherical bearing, a wire rope or any other mechanism.

The faces 313 of the arms 311 of the bottom plate can have flat profile as shown in FIGS. 10a and 10b; however, in further embodiments, the faces 313 can have a convex or concave profile. Similarly, while the slab 331 of the top plate 330 can have a flat profile on the underside of the top plate 330 where bellows 300 of a bellows assembly 301 engage the underside of the top plate 330, in further embodiments, the underside of the top plate 330 can have a convex or concave profile. The angle θ between the faces 313 of the arms 311 is shown as being 70° in the example of FIGS. 10a and 10b; however, in further examples, the angle θ can be within the range of 90°-60°, 75°-65°, 71°-69°, and the like.

An actuator can comprise one or a plurality of plates in various examples. An actuator assembly 101 with multiple plates can have plates that are rotatably coupled. Bellows 300 can be disposed between the plates, with the surface of the plates interfacing with the bellows 300. An actuator assembly 300 can comprise plates in any suitable architecture, in any suitable shape. This can include strain plates, angled plates, ribbed plated, extruded section plates, multi-piece plates, or the like.

In some embodiments, the interfacing faces of the plates 310, 330 can be curved, or have some complex geometry. Modifying the topography of a plate can change the performance of an actuator assembly 101 in some examples. Actuator performance or durability can be optimized by such deviations from the baseline, flat, plate design. Geometric deviations can be of a variety of forms, including single plane curvature, compound, multi-plane curvature, the addition of bosses or holes, or the like. Top and bottom plates 310, 330 can be fabricated through a variety of processes, including die casting, progressive stamping, laser cut and bent, injection over-molded, or the like.

In various embodiments, the top and bottom plates 310, 330 can comprise any suitable material, including a polymer, metal, wood, composite material, a combination of materials, or the like. Additionally, although specific configurations of the top and bottom plates 310, 330 is shown herein, further embodiments can include plates having any suitable configuration. For example, various suitable embodiments of the top and bottom plates 310, 330 can be configured to interface with the bellows 300 so as to distribute a point load from a flexure, pivot, axel or hub assembly. Plates can also comprise and leverage existing structures, such as mounting piles, spanning beams or the like.

Top and bottom plates 310, 330 can be made in any suitable way. For example, in one embodiment, a cold rolling process can be used in conjunction with metal stamping to create a C-channel plate with the appropriate interfacing features for the top and bottom plates 310, 330 as described herein. Plates can also be formed of standard hot and cold-rolled sections. Plate features can be die cut, CNC punched, laser cut, waterjet cut, milled or any other suitable subtractive manufacturing method. A plate can also comprise multiple standard sections or custom formed parts. Plates of this nature can be bonded together with a variety of fasteners, including rivets, nuts and bolts, welds or the like.

In another embodiment, manufacture of the top and bottom plates 310, 330 can include the creation and processing of composite panels. For example, a composite top or bottom plate 310, 330 can comprise a multi-material sandwich plate that takes advantage of a lightweight and inexpensive core material and the stiffness and strength of thinner sheets of skin material that can adhere to either side of the core substrate. Such composite paneling can be used as high stiffness, high strength, low weight, low-cost flooring or construction material.

In some embodiments, a composite top or bottom plate 310, 330 can comprise a honeycombed polymer core that can take compressive and shear loads, sandwiched between two metal skins that can bear the high tensile stresses caused by bending. It is possible to bind the top or bottom plate 310, 330 with bolts, heated staked columns, ultrasonic welding, or the top or bottom plates 310, 330 can be assembled with an adhesive.

Utilizing metal stamping, top and bottom plates 310, 330 can be produced having multi-planar curvature stamped metal skins and an injection-molded polymer core. The structure that such geometry creates can give greater stiffness to a top and bottom plate 310, 330 per the volume of material used and provides an opportunity to cut down on the expensive metal skin material. Stiffening features, such as ribs, bosses, deep drawn pockets and webbing, can also be incorporated into the design of top and bottom plates 310, 330 in some embodiments.

In some embodiments, the plates need not be single planar elements. For instance, the bottom plate 310 can be two individual surfaces each parallel to the two opposing flanges of the post such that the bellow interfaces point 180 degrees away from one another rather than 0 degrees as in other example configurations. The body of each of the bellows 300 then could bend through 90 degrees to meet the top plate 330 when the actuator assembly 101 is level. In this case, the plate may not be a bending element, but instead be compressive. The plates 310, 330 can also take a V-shape with major angle dictated by the desired range of motion of the actuator assembly 101.

For example, an actuator assembly 101, in accordance with a further embodiment, can include a top plate having first and second portions that are rotatably coupled at a joint. Such first and second bellows 300 can be coupled to respective bottom sides of the first and second portions and to a side of a post. Inflation of the bellows 300 can make the top plate assume a flat configuration, whereas deflation of the bellows 300 can make the top plate assume a V-shape configuration.

Bellows 300 can be affixed to the actuator assembly 101 and top and bottom plates 310, 330 in various suitable ways. Bellows 300 that are not securely attached in some examples can fall out of position, causing improper actuator behavior and performance, or can cause the actuator assembly 101 to cease to work together. A feature or mechanism used to keep the bellows 300 in place can be a "constraint," or the like.

In one embodiment, such a constraint can comprise a fabric sheath that wraps around the bellows 300 and connects them to an attachment point on the plates 310, 330 and/or hub assembly 370 of the actuator 101. The fabric wrap can encircle a single bellows 300 in some embodiments. In such an embodiment, the wrap can be terminated with a slotted rod, hooks, grommets or any other suitable feature. These features can then be used to attach the constraint-wrapped bellows 300 to the actuator assembly 101. In another embodiment, the constraint can be designed to encircle two separate bladders and connect them by an interstitial web 303. This web 303 can be perforated with grommets or have any other features or fasteners incorporated to it. The connected wrapped bellows 300 can then by disposed on either side of the actuator pivot point or ridge 312, between top and bottom plates 310, 330, the web 303 draped either over the pivot point or ridge 312, the center axis of the top or bottom V-plate 310, 330, or over any other suitable feature.

As an example, a flat sheet of polymer-coated fabric can be laid out on a table. Two bellows 300 can be disposed, parallel to each other on top of the fabric. The two edges of the fabric, parallel to the long axis of the bellows 300, can be pulled over their respective bellows 300. The edges can be then joined in the middle and pinned to the center of the fabric sheet. This assembly of two bellows 300 can be wrapped in fabric and connected to each other via a web 303, which can define a bellows unit 302, as discussed herein. The web 303 can be perforated or can have grommets installed. These holes can then be draped over interfacing bolts or pins, located on the ridge 312 of a bottom V-Plate 310. Nuts or other suitable fasteners can be used to secure the constraint and, thus, the bellows 300 in the appropriate location.

In another example, the aforementioned construction, two separate bellows 300 wrapped by fabric and connected via an interstitial fascia, can be disposed on the same side of the pivot on an actuator assembly 101 to form a stacked bellows configuration. This can be mirrored onto opposing side of the actuator assembly 101, across the pivot point for a total of four bellows 300, two on each side in a stacked configuration. A wire rope can then be looped to girdle the interstitial webs 303 between each bellows chamber pair and constrain them to the central pivot point, hub assembly 370 or V-plate ridge 312.

Constraints can be made of any suitable material, including steel, aluminum, HDPE, PVC, fiberglass, carbon fiber, fabric, polymer-coated fabric, spun polymer like Spectra or Dyneema, or the like. Constraints can be reinforced with nylon webbing, wire rope, fabric, Spectra, Dyneema, or any other suitable method. Constraints can be manufactured by sewing, heat welding, extrusion, injection molding, blow molding, roto-molding, die casting, stamping or any other suitable method.

Figure 11A:
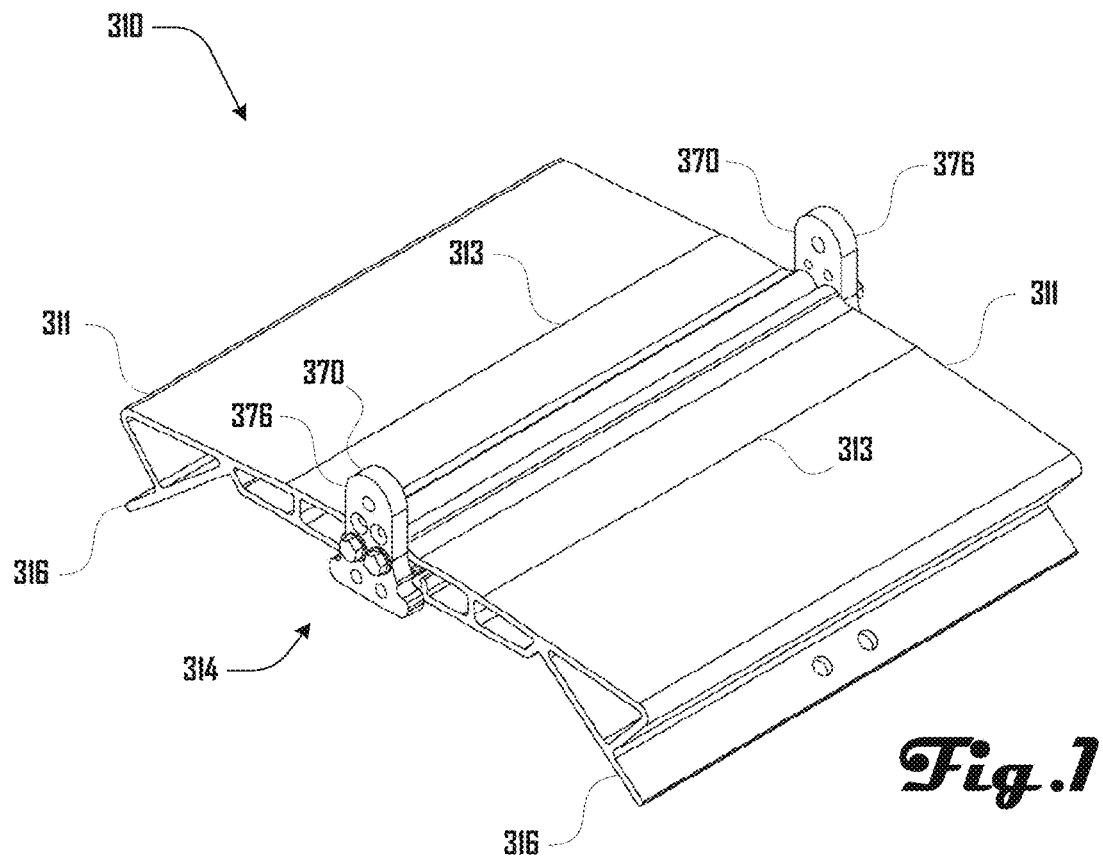
FIGS. 11a and 11b illustrate a perspective view and a side view of the bottom plate of FIGS. 10a and 10b in accordance with an embodiment an in a second configuration.
Figure 11B:
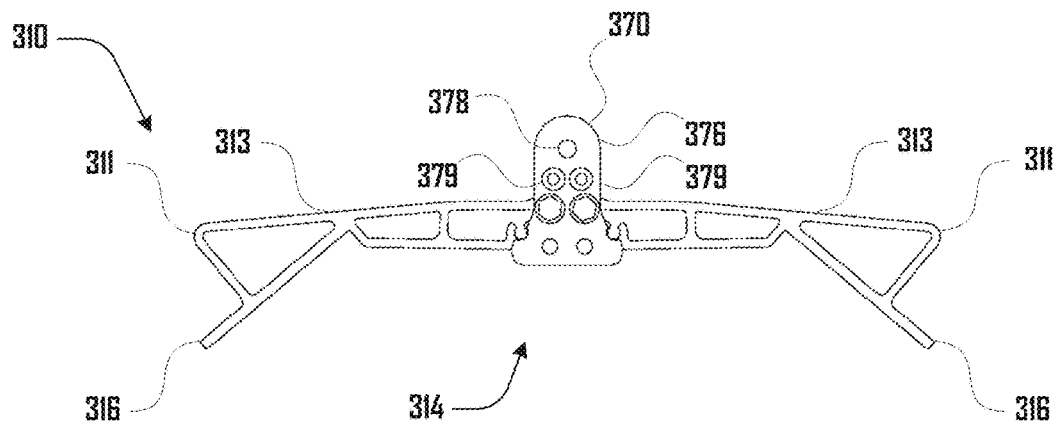
Figure 12A:
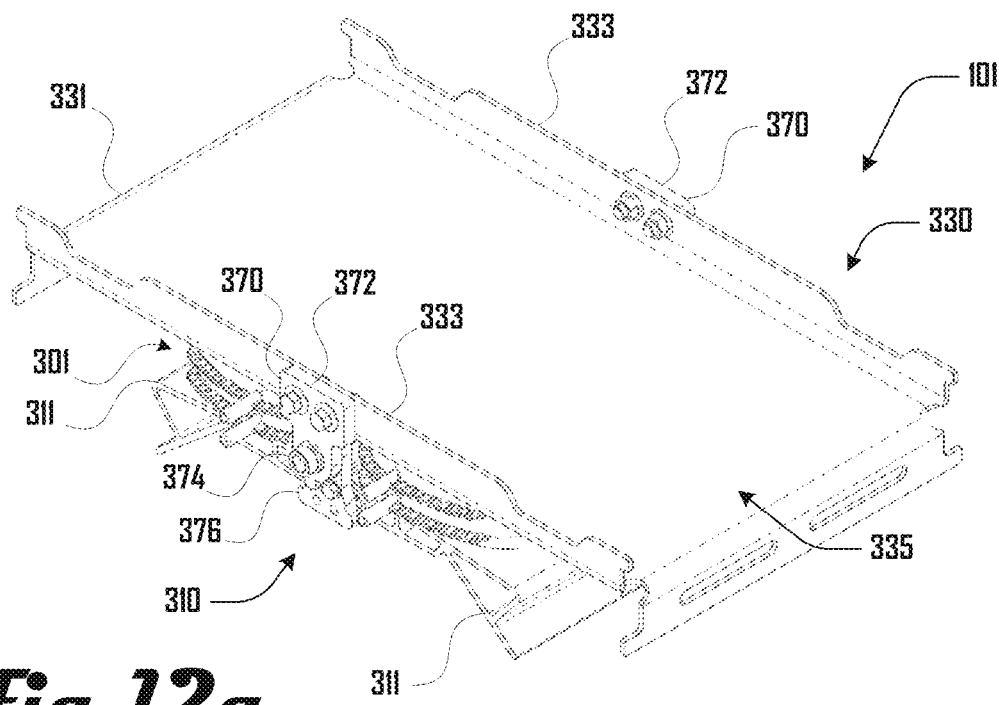
FIGS. 12a and 12b illustrate a perspective view and a side view of the actuator assembly having the bottom plate of FIGS. 11a and 11b in the second configuration.
Figure 12B:
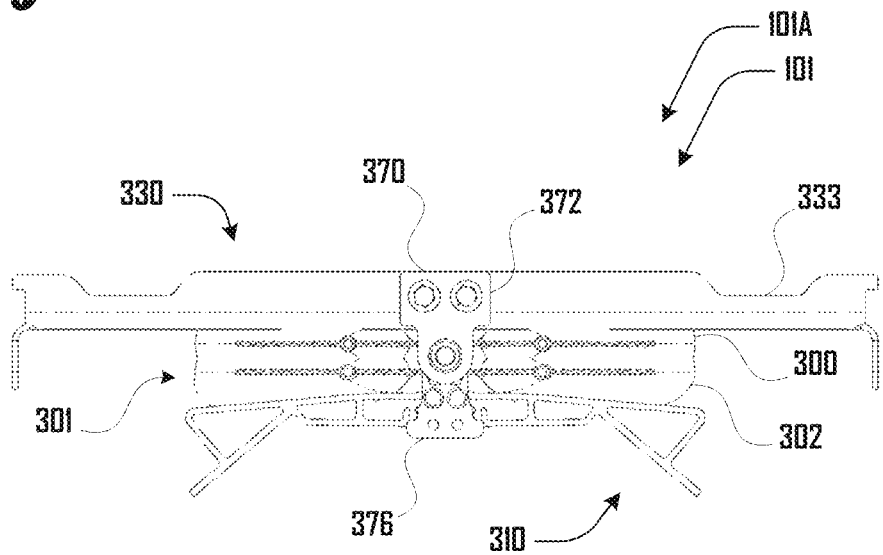
Figure 13:
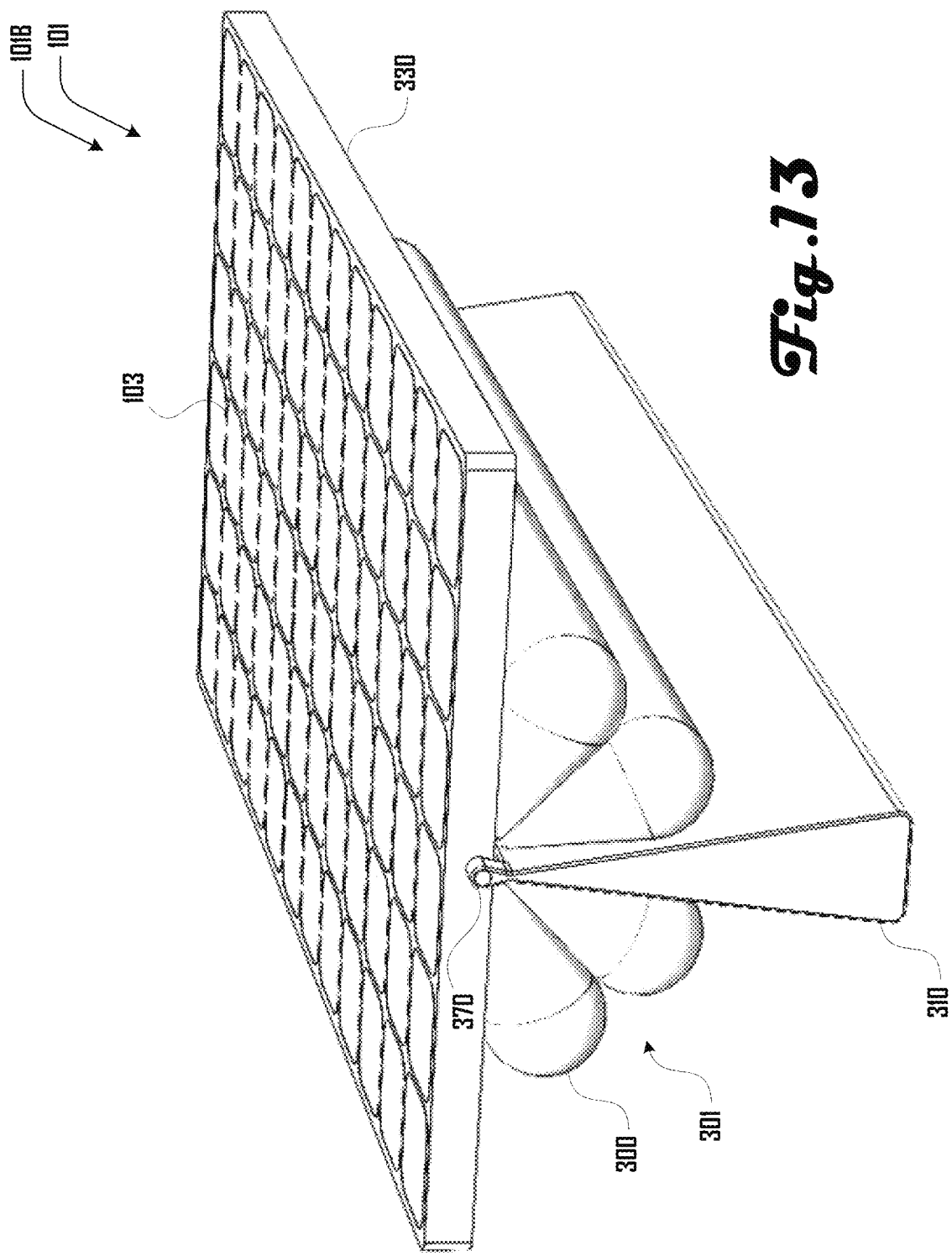

In various examples, the bottom plate 310 can be configurable from an angled configuration as shown in FIGS. 10a and 10b, to a flat configuration as shown in FIGS. 11a and 11b, where the arms 311 can be folded from being disposed relative to each other at angle θ to being generally flat. Such a flat configuration can be desirable in some embodiments for shipping and transportation of an assembled actuator assembly 101 having the bottom plate or transportation of the bottom plate 310 as a separate unit. FIGS. 12a and 12b illustrate an embodiment 101A of an actuator assembly 101 having a top plate 330, bottom plate 310 and bellows assembly 301, with the bottom plate 310 in a flat configuration (e.g., as shown in FIGS. 11a and 11b).

While various embodiments of an actuator assembly 101 include top and bottom plates 310, 330 that are spaced apart via a hub assembly 370 (e.g., actuator assembly 101A of FIGS. 6a-12b) in some embodiments, the top and bottom plates 310, 330 can be directly coupled or proximately coupled via a hub assembly 370 (e.g., an actuator assembly 101B, 101C, 101D, 101F as shown in FIGS. 13, 14a, 14b, 15a, 15b and 18a).

Additionally, various embodiments discussed herein include a planar top plate 330 and a triangular or V-shaped bottom plate 310. For example, FIG. 15a illustrates an example embodiment 101C of an actuator assembly 101 having a planar top plate 330 and a triangular or V-shaped bottom plate 310, whereas FIG. 15b illustrates an example embodiment 101D of an actuator assembly 101 having a V-shaped top plate 330 and a triangular or V-shaped bottom plate 310.

Figure 16:
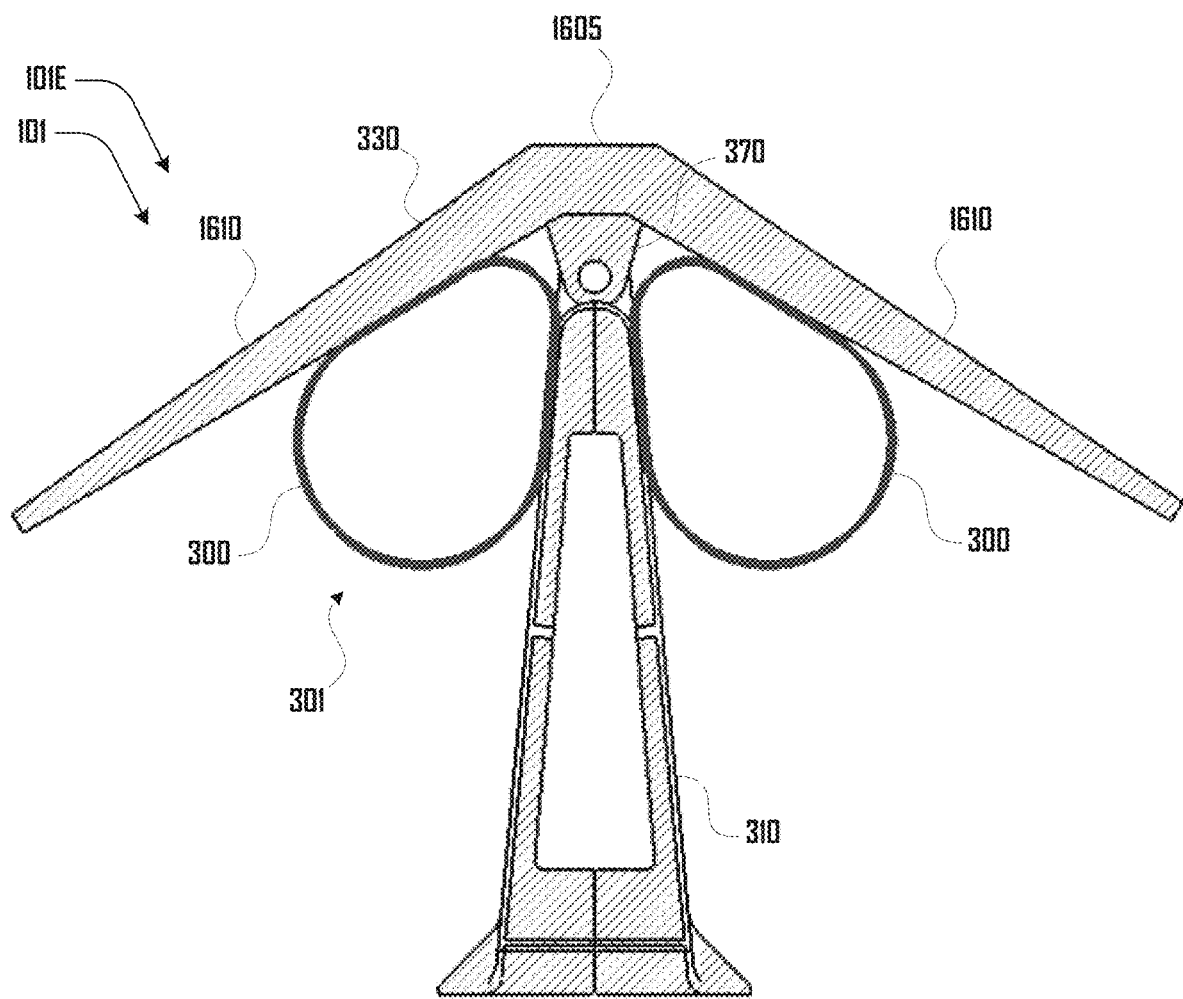
FIGS. 16 and 17 illustrate an embodiment of an actuator assembly in accordance with yet another embodiment.
Figure 17:
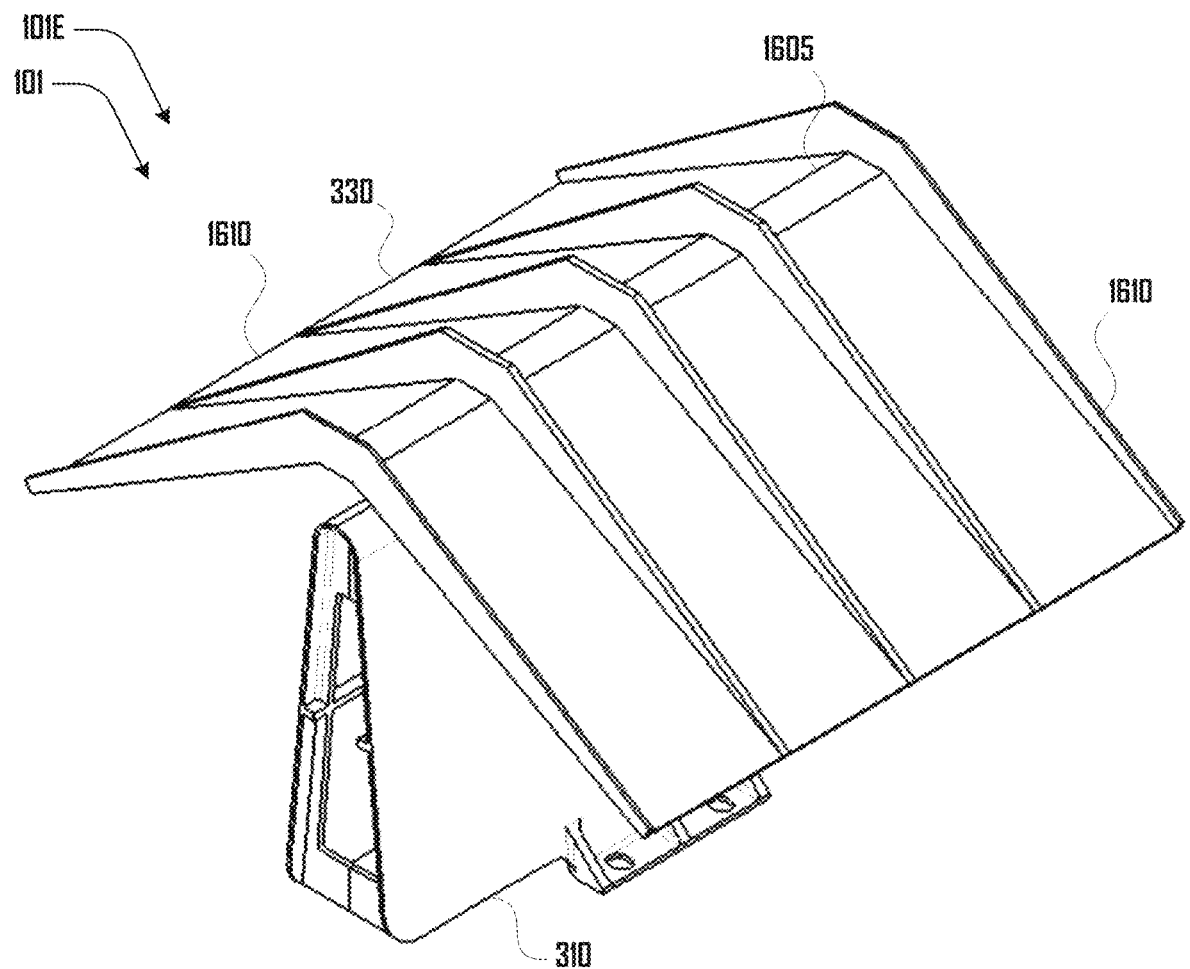

In further embodiments, the top plate 330 of an actuator assembly 101 can have other non-planar configurations. For example, FIGS. 16 and 17 illustrate an embodiment 101E of an actuator assembly 101 having a top plate 330 with a planar portion 1605 and a pair of arms 1610 that extend at an angle from the planar portion 1605 of the top plate.

Figure 18A:
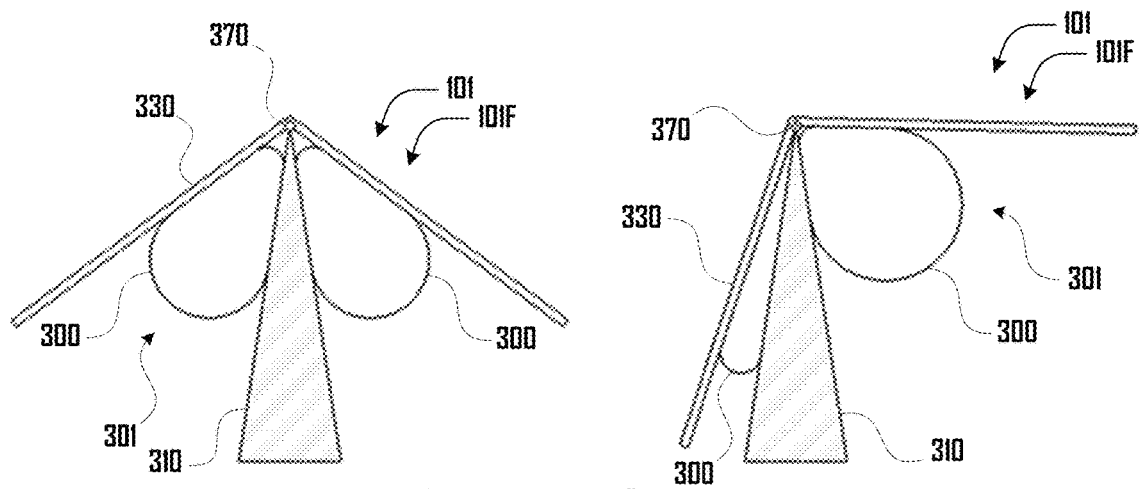
FIG. 18a illustrates an embodiment of an actuator assembly in accordance with a further embodiment.
Figure 18B:
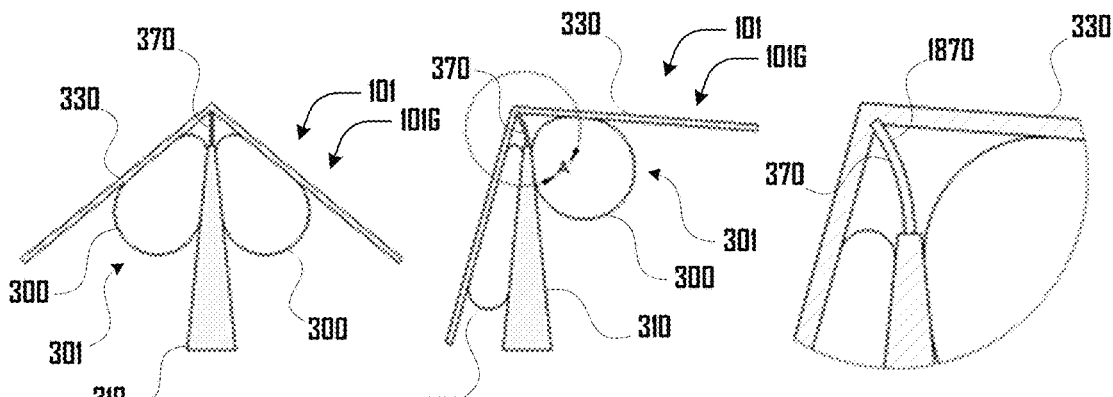
FIG. 18b illustrates an embodiment of an actuator assembly in accordance with a still further embodiment.
Figure 18C:
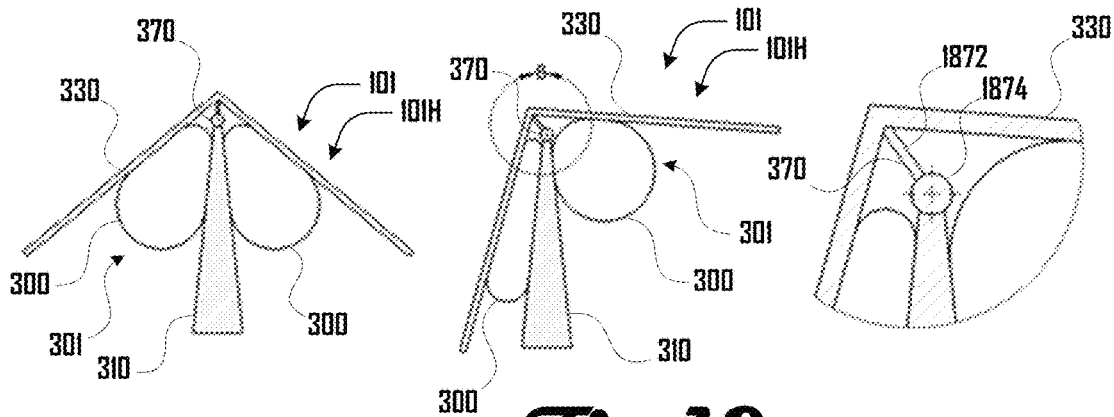
FIG. 18c illustrates an embodiment of an actuator assembly in accordance with another embodiment.
Figure 20:
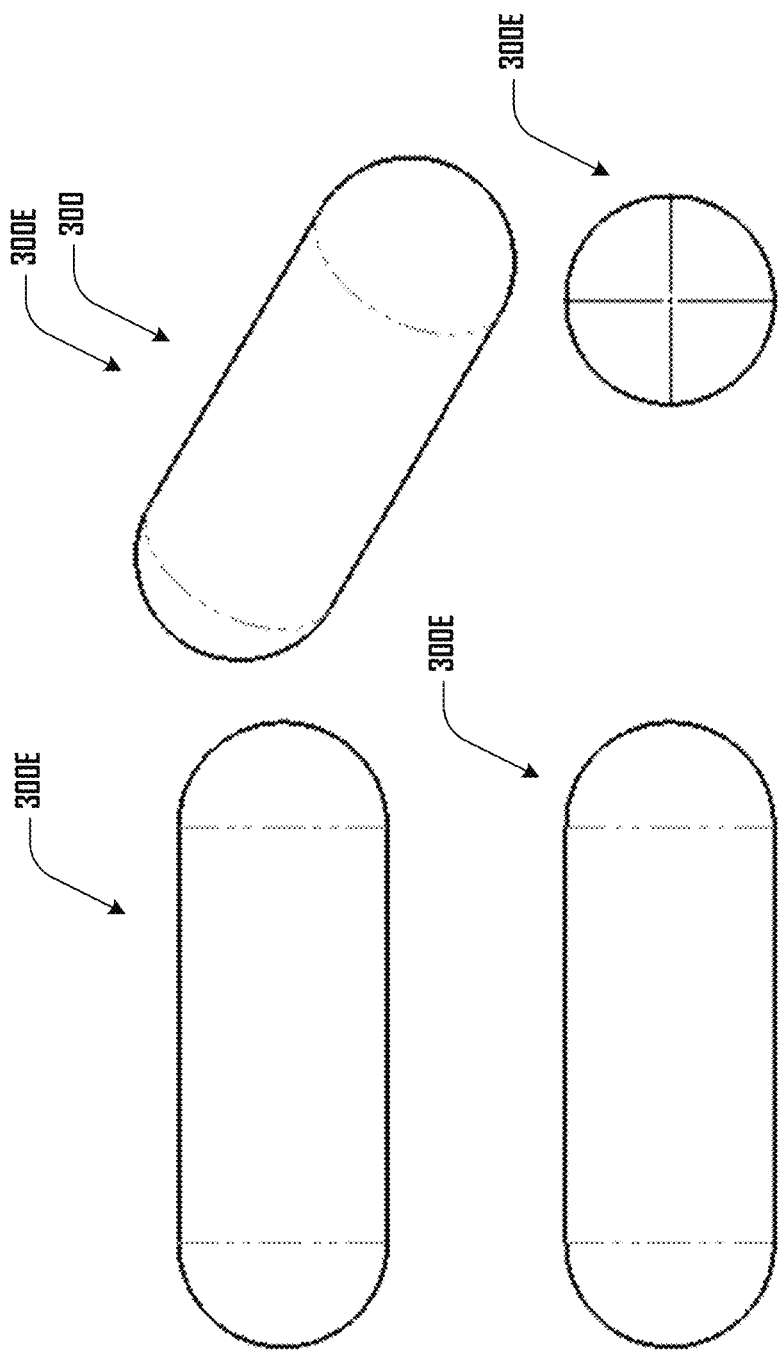
FIGS. 20, 21a, 21b, 22a and 22b illustrate example embodiments of a bellows.
Figure 21A:
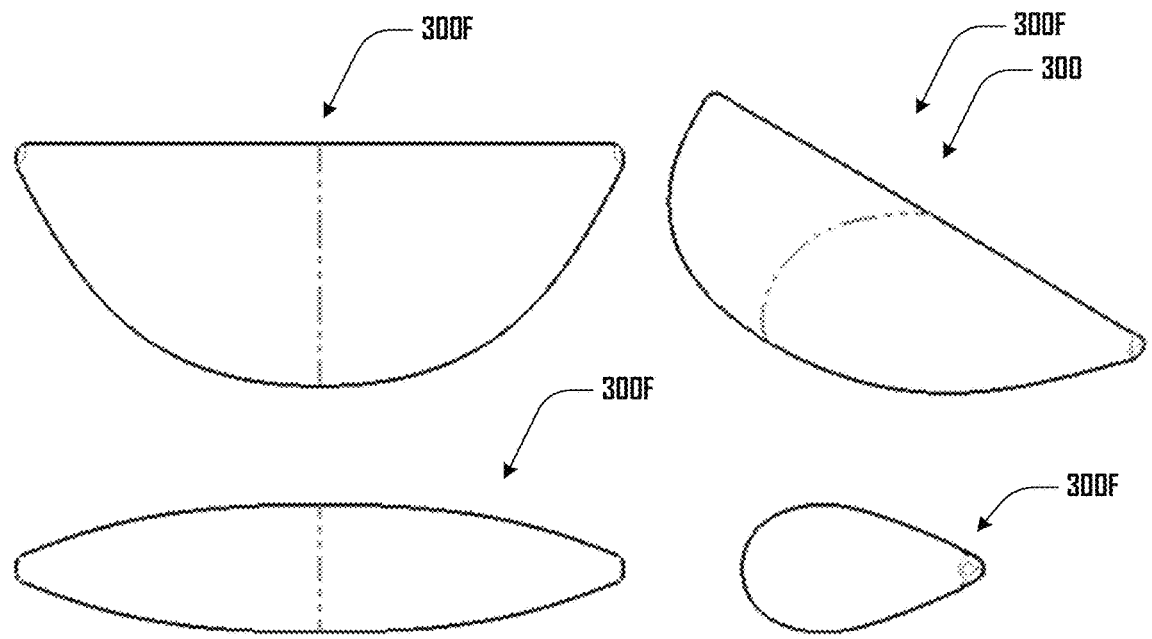
Figure 21B:
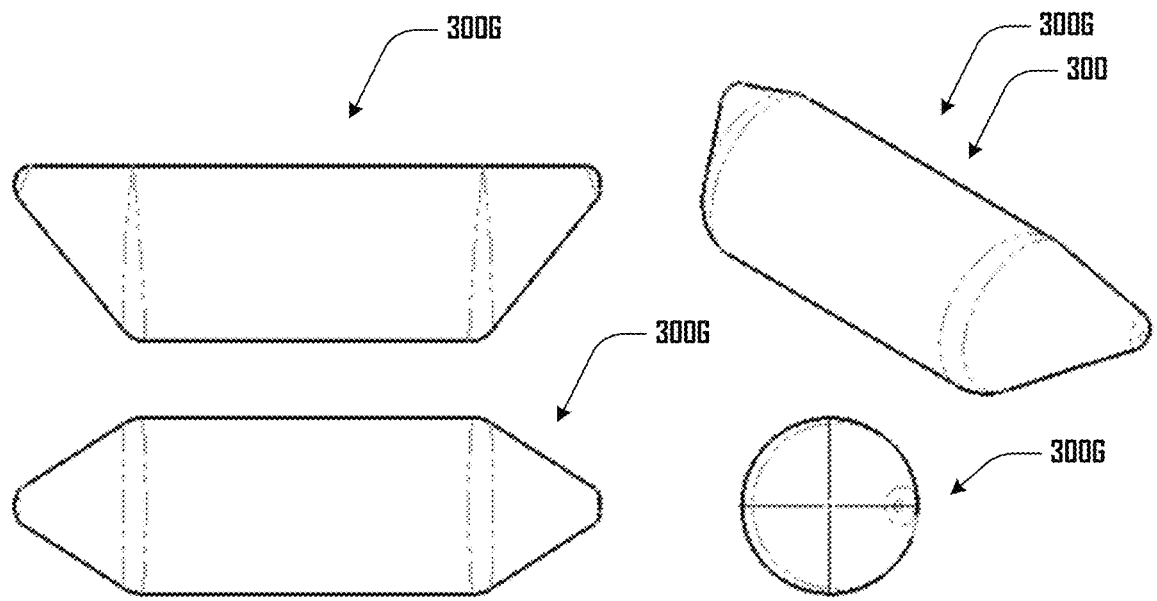
Figure 22A:
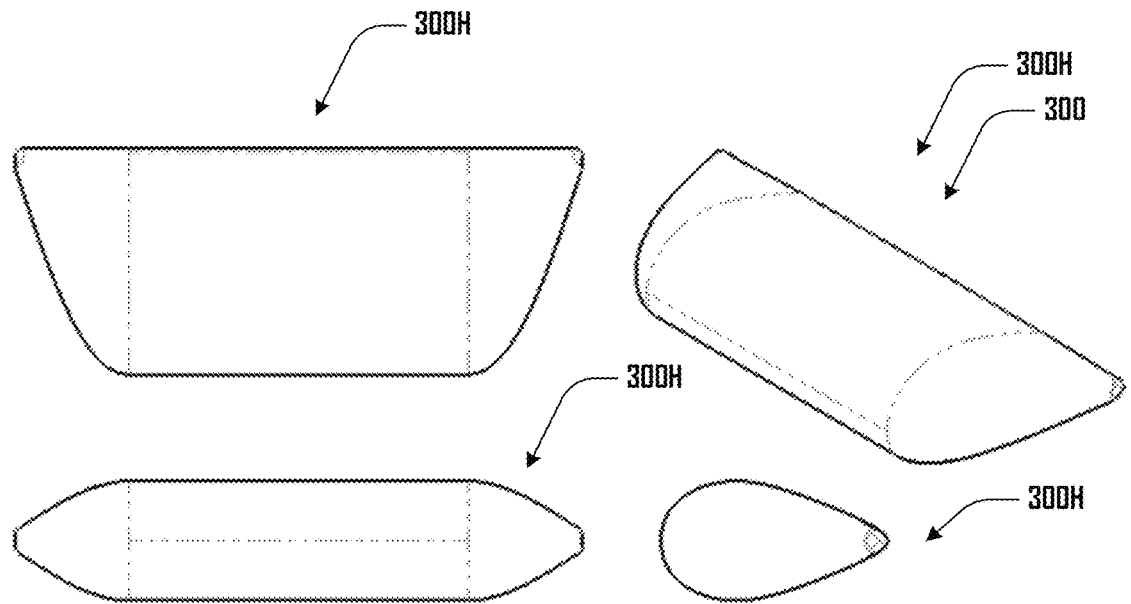
Figure 22B:
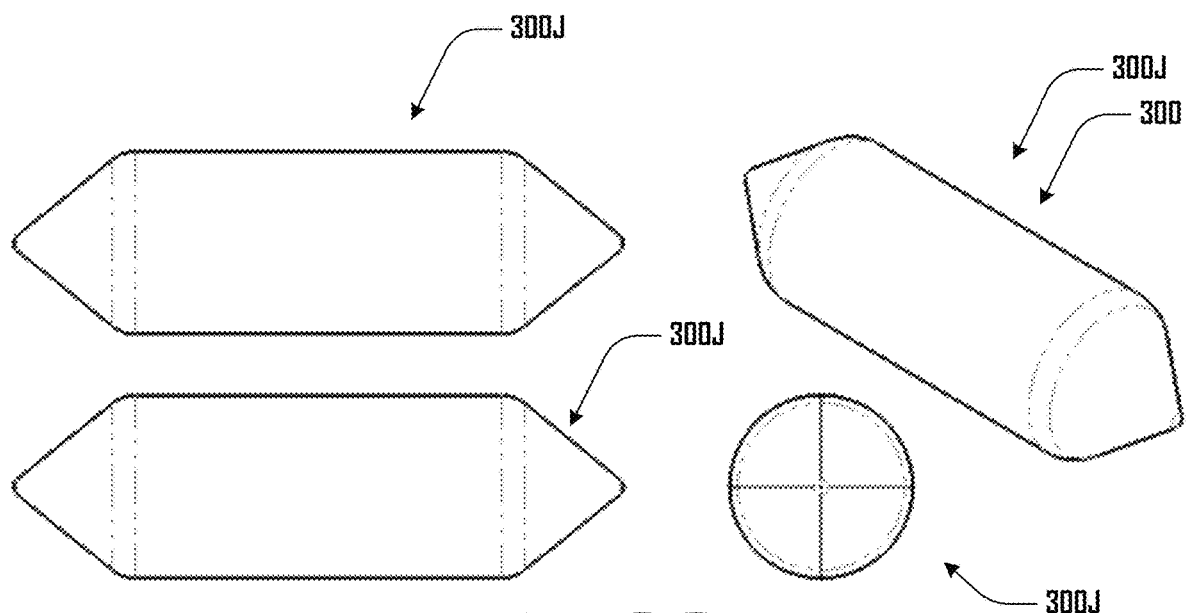

Also, while various embodiments can comprise a hub assembly 370 having a top and bottom hub assembly portion 372, 376 rotatably coupled via a shoulder bolt 374, a hub assembly 370 can be configured in various other suitable ways. For example, FIG. 18b illustrates an example embodiment of an actuator assembly 101G having a hub assembly 370 comprising a flexure 1870 that couples the top and bottom plates 310, 330. In various examples, the flexure 1870 can include a flexible member that bends as the top plate 330 is actuated by bellows 300 of a bellows assembly 301. In another example, FIG. 18c illustrates a further example embodiment of an actuator assembly 101H having a hub assembly 370 comprising a rod 1872 that extends from the top plate 330 and coupled with an axle 1874 that is rotatably coupled to the base plate 310 such that the top and bottom plates 310, 330 are rotatably coupled.

Turning to FIGS. 19a and 19b, in some embodiments, a top plate 330 can be T-shaped and can include a bar 1930 with a spine 1932 that extends from a central location of the bar 1930. The T-shaped top plate 330 can be rotatably coupled to a peak of a bottom plate 310 via a hub assembly 370. The bottom plate 310 can comprise an actuator cavity 1932 defined by arms 1914 of the base plate 310. In these example embodiments 101J, 101K, a bellows assembly 301 can be disposed within the actuator cavity with bellows 300 engaging and disposed on opposing sides of the spine 1932. As the bellows 300 are inflated or deflated, the bellows 300 can push and/or pull on the spine 1932 such that the top plate 330 rotates relative to the base plate 310.

In the embodiment 101J of FIG. 19a, the top plate 330 can be coupled to the hub assembly 370 along a length of the spine 1932, whereas in the embodiment 101K of FIG. 19b the top plate 330 can be coupled to the hub assembly 370 at a junction of the spine 1932 and bar 1930.

In some embodiments, V-plate bulbous actuators can be antagonistically positioned in a V-configuration with a flexure or pivot at the turning point. Compliant cylinders can be inflated antagonistically so as to effect a strong pressure to position ratio. The cylinders can be constructed in multiple ways, including blow molding, rotomolding, with a fabric tube with sealed ends, with a sewn fabric envelope with separate impermeable bladder, and the like. Multiple bulbous actuators can be stacked for greater range of motion.

For example, one example embodiment of an actuator assembly can comprise a first and second bellows 300, which can be respectively disposed in chambers of a cavity defined by a sector body and a spine that is rotatably coupled to the sector body at an axle. The sector body can be defined by a pair of radial arms and an arc rim. The radial arms can extend from the axel with the arc rim extending between the opposite ends of the radial arms.

The spine can be coupled to a portion of a plate, which, in this example, is coupled at an approximately 90 degree angle from a face of the plate substantially at the center of the plate. The sector body can maintain a fixed position relative to the ground (e.g., via a post or the like) and the plate can be rotated by selective inflation and/or deflation of one or both of the actuators.

In the example configuration, the plate can be in a flat configuration where a top face of the plate is generally parallel with the ground or perpendicular to gravity. In such a configuration, the first and second actuator can be inflated substantially the same amount, which makes them of equal width within the respective chambers. In contrast, a tilted configuration where the first actuator is less inflated than the second actuator can cause the volume of the first chamber to decrease and the volume of the second chamber to increase. Accordingly, the spine can be rotated within the cavity, which in turn can cause the plate to tilt.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A solar tracker comprising:
    a plurality of photovoltaic cells disposed in a common plane and extending along a first length having a first axis, the plurality of photovoltaic cells coupled to rails that extend along a second axis that is parallel to the first axis;
    a plurality of pneumatic actuators coupled to the rails and configured to collectively rotate the plurality of photovoltaic cells, the plurality of pneumatic actuators disposed along a common third axis that is parallel to the first and second axis, each of the plurality of pneumatic actuators comprising:

a V-shaped bottom plate having a ridge and a pair of arms disposed at an angle of 90°-60° relative to each other;

a planar top plate;

a first and second hub assembly extending between the bottom and top plates on opposing front sides of the actuator, the first and second hub assembly comprising a respective rotatable coupling that forms a rotatable coupling between the top plate and bottom plate; and a plurality of stacked bellows units disposed between the top plate and bottom plate, the bellows units each comprising:

a first and second elongated and tubular inflatable bellows coupled by a web extending between the first and second bellows, the first and second bellows defining respective and separate first and second bellows cavities, the webs of the bellows units disposed at the ridge of the bottom plate with the first bellows of the bellows units disposed on a first side of the ridge between the top plate and bottom plate, and the second bellows of the bellows units disposed on a second side of the ridge, opposing the first side, and between the top and bottom plates.

2. The solar tracker of claim 1, wherein the pneumatic actuators are configured to move the top plate relative to the bottom plate by inflation of the first and second bellows by introducing a fluid into one or both of the first and second bellows cavities.

3. The solar tracker of claim 2, wherein the first bellows of the plurality of actuators are configured to be inflated as a first group and wherein the second bellows of the plurality of actuators are configured to be inflated as a second group separate from the first group.

4. The solar tracker of claim 1, wherein each of the actuators is coupled to a respective post, with the posts disposed in the ground to couple the solar tracker to the ground.

5. The solar tracker of claim 1, wherein each of the actuators are configured to assume a configuration wherein the given actuator has a central plane of symmetry that extends through the hub assemblies and the ridge of the bottom plate, with the first and second bellows on opposing sides of the plane of symmetry.

6. A pneumatic actuator comprising:

a V-shaped bottom plate that defines a ridge;

a planar top-plate;

a first and second hub assembly extending between the bottom and top plates on opposing sides of the actuator, the first and second hub assembly comprising a respective rotatable coupling that forms a rotatable coupling of the top plate and bottom plate; and a plurality of stacked bellows units disposed between the top plate and bottom plate, the bellows units comprising a first and second elongated inflatable bellows coupled by a web extending between the first and second bellows, the first and second bellows defining respective and separate first and second bellows cavities, the webs of the bellows units disposed at the ridge of the bottom plate with the first bellows of the bellows units disposed on a first side of the ridge between the top plate and bottom plate, and the second bellows of the bellows units disposed on a second side of the ridge, opposing the first side, and between the top and bottom plates.

7. The pneumatic actuator of claim 6, wherein the pneumatic actuator is configured to move the top plate relative to the bottom plate by inflation of the first and second bellows.

8. The pneumatic actuator of claim 6, wherein the pneumatic actuator is configured to assume a configuration wherein the pneumatic actuator has a central plane of symmetry that extends through the hub assemblies, with the first and second bellows on opposing sides of the plane of symmetry.

9. An actuator comprising:

a bottom plate;

a top-plate;

one or more hub assembly extending between and rotatably coupling the bottom and top plates; and one or more bellows units disposed between the top plate and bottom plate, the one or more bellows units comprising a first and second inflatable bellows coupled by a web extending between the first and second bellows, the first and second bellows defining respective and separate first and second bellows cavities, with the first bellows of the bellows units disposed on a first side of the bottom plate, and the second bellows of the bellows units disposed on a second side of the bottom plate, opposing the first side, and between the top and bottom plates.

10. The actuator of claim 9, wherein the bottom plate comprises a ridge and wherein one or more webs of the one or more bellows units are disposed at the ridge of the bottom plate.

11. The actuator of claim 9, wherein a first and second hub assembly extend between the bottom and top plates on opposing sides of the actuator.

12. The actuator of claim 9, wherein the bottom plate is V-shaped with a pair of arms disposed at 90°-60° relative to each other.

13. The actuator of claim 9, comprising a plurality of bellows units, and wherein the plurality of bellows units are stacked between the top plate and bottom plate.

14. The actuator of claim 13, wherein the plurality of bellows units are stacked over a ridge of the bottom plate.

15. The actuator of claim 9, wherein the actuator is configured to move the top plate relative to the bottom plate by inflation of the first and second bellows.

16. The actuator of claim 9, wherein the actuator is configured to assume a configuration wherein the actuator has a central plane of symmetry that extends through the one or more hub assemblies, with the first and second bellows on opposing sides of the plane of symmetry.

17. The actuator of claim 9, wherein the first and second bellows are elongated and tubular and have a length between opposing sides of the actuator that is larger than a width of the bellows between top and bottom plates.

18. The actuator of claim 9, wherein the one or more hub assemblies extending between and rotatably coupling the bottom and top plates comprise a shoulder bolt that forms a rotatable coupling between the top and bottom plates.

19. The actuator of claim 9, wherein the bottom plate comprises a pair of foldable arms, with the pair of foldable arms configured to assume a first V-shaped configuration and configured to assume a second generally flat configuration.

20. A solar tracker comprising:

a plurality of photovoltaic cells disposed in a common plane and extending along a first length having a first axis, the plurality of photovoltaic cells coupled to rails that extend along a second axis that is parallel to the first axis; and a plurality of pneumatic actuators coupled to the rails and configured to collectively rotate the plurality of photovoltaic cells, the plurality of pneumatic actuators disposed along a common third axis that is parallel to the first and second axis, each of the plurality of pneumatic actuators comprising the actuator of claim 9.

* * * * *